(12) United States Patent
Uriel

(10) Patent No.: US 10,191,828 B2
(45) Date of Patent: *Jan. 29, 2019

(54) METHODS AND APPARATUS TO CONTROL A MONITORING AGENT IN A COMPUTING ENVIRONMENT

(71) Applicant: VMware, Inc., Palo Alto, CA (US)

(72) Inventor: Ilan Uriel, Herzliya (IL)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/706,470

(22) Filed: May 7, 2015

(65) Prior Publication Data

US 2016/0328247 A1    Nov. 10, 2016

(51) Int. Cl.
  *G06F 9/00*    (2006.01)
  *G06F 11/30*   (2006.01)

(52) U.S. Cl.
  CPC ...... *G06F 11/3024* (2013.01); *G06F 11/3055* (2013.01)

(58) Field of Classification Search
  CPC ............ G06F 9/44505; G06F 11/3024; G06F 11/3055; G06F 9/445
  USPC ............ 713/100; 726/6; 718/102, 1, 103; 709/224; 714/2; 702/186; 717/174, 143
  See application file for complete search history.

(56) References Cited

U.S. PATENT DOCUMENTS

| 7,124,405 | B1* | 10/2006 | Kakivaya | G06F 9/524 |
| | | | | 717/143 |
| 8,528,000 | B2* | 9/2013 | Schumacher | G06F 8/10 |
| | | | | 703/14 |
| 9,806,978 | B2* | 10/2017 | McAlister | G06F 11/3006 |
| 2003/0212814 | A1* | 11/2003 | Tzeng | H04L 47/10 |
| | | | | 709/235 |
| 2004/0060045 | A1* | 3/2004 | Hind | G06F 11/2247 |
| | | | | 717/174 |
| 2004/0181385 | A1* | 9/2004 | Milne | G06F 17/5022 |
| | | | | 703/14 |
| 2008/0189712 | A1* | 8/2008 | Boris | G06F 9/5083 |
| | | | | 718/103 |
| 2011/0154344 | A1* | 6/2011 | Avni | G06F 9/4881 |
| | | | | 718/102 |
| 2012/0159178 | A1* | 6/2012 | Lin | H04L 9/3247 |
| | | | | 713/178 |
| 2012/0166818 | A1* | 6/2012 | Orsini | H04L 9/085 |
| | | | | 713/193 |
| 2013/0198510 | A1* | 8/2013 | Rahman | H04L 9/321 |
| | | | | 713/155 |
| 2013/0212578 | A1* | 8/2013 | Garg | H04L 43/0882 |
| | | | | 718/1 |

(Continued)

Primary Examiner — Aurel Prifti
(74) Attorney, Agent, or Firm — Clayton, McKay & Bailey, PC

(57) ABSTRACT

Methods, apparatus, systems and articles of manufacture to control a monitoring agent are disclosed herein. An example method includes instructing, via a processor, a monitoring agent of a compute node to perform a first monitoring operation associated with a first monitoring level. A second monitoring level is transitioned to in response to the first monitoring operation returning a first result that is within an acceptable threshold. In response to transitioning to the second monitoring level, an access right of a pre-requisite of the first monitoring operation at the compute node is modified without uninstalling the pre-requisite.

18 Claims, 8 Drawing Sheets

(56) References Cited

U.S. PATENT DOCUMENTS

| | | | |
|---|---|---|---|
| 2013/0283090 A1* | 10/2013 | Bradley | G06F 11/0793 714/2 |
| 2013/0318540 A1* | 11/2013 | Kumura | G06F 9/46 718/106 |
| 2015/0089494 A1* | 3/2015 | Beak | G06F 9/45558 718/1 |
| 2015/0263909 A1* | 9/2015 | Okubo | H04L 43/10 709/224 |
| 2015/0355990 A1* | 12/2015 | Cole | G06F 11/3093 702/186 |
| 2016/0117180 A1* | 4/2016 | Cardonha | G06F 9/44505 713/100 |
| 2016/0226864 A1* | 8/2016 | Fakhrai | H04L 63/0853 726/6 |

* cited by examiner

METHODS AND APPARATUS TO CONTROL A MONITORING AGENT IN A COMPUTING ENVIRONMENT

FIELD OF THE DISCLOSURE

This disclosure relates generally to computing resource utilization, and, more particularly, to methods and apparatus to control a monitoring agent.

BACKGROUND

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables efficient deployment of computing resources within an enterprise. For example IaaS systems may enable developers to build, deploy, and manage the lifecycle of a web application (or any other type of networked application) at a greater scale and at a faster pace than before. Server administrators seek to monitor the computing platforms to prevent and/or understand failure conditions.

BRIEF DESCRIPTION OF THE DRAWINGS

Wherever possible, the same reference numbers will be used throughout the drawing(s) and accompanying written description to refer to the same or like parts.

DETAILED DESCRIPTION

Figure 1:
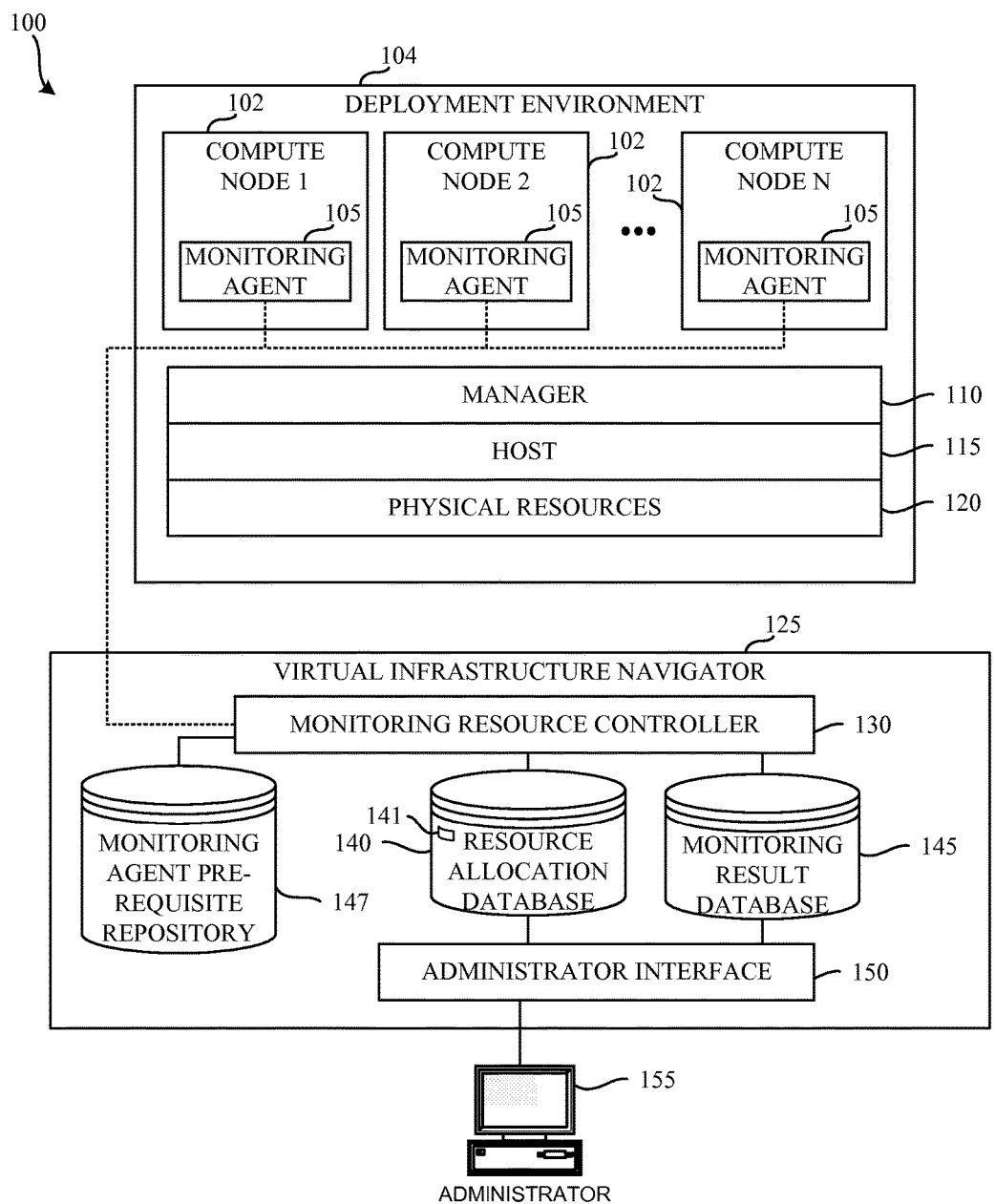
FIG. 1 is a block diagram of an example system constructed in accordance with the teachings of this disclosure to control monitoring resource utilization of a compute node.

Virtual computing services enable one or more compute nodes (CN) to be hosted within a deployment environment. As disclosed herein, a CN is a computing resource (physical or virtual) that may host a wide variety of different applications such as, for example, an email server, a database server, a file server, a web server, etc. CNs include physical hosts (e.g., non-virtual computing resources such as servers, processors, computers, etc.), virtual machines (VM), containers that run on top of a host operating system without the need for a hypervisor or separate operating system, hypervisor kernel network interface modules, etc. In some examples, a CN may be referred to as a data computer end node or as an addressable node.

VMs operate with their own guest operating system on a host using resources of the host virtualized by virtualization software (e.g., a hypervisor, virtual machine monitor, etc.). Numerous VMs can run on a single computer or processor system in a logically separated environments (e.g., separated from one another). A VM can execute instances of applications and/or programs separate from application and/or program instances executed by other VMs on the same computer.

In examples disclosed herein, containers are virtual constructs that run on top of a host operating system without the need for a hypervisor or a separate guest operating system. Containers can provide multiple execution environments within an operating system. Like VMs, containers also logically separate their contents (e.g., applications and/or programs) from one another, and numerous containers can run on a single computer or processor system. In some examples, utilizing containers, a host operating system uses name spaces to isolate containers from each other to provide operating-system level segregation of applications that operate within each of the different containers. This segregation can be viewed as a form of virtualization that isolates different groups of applications that operate in different containers. In some examples, such containers are more lightweight than VMs.

To monitor the operation of a CN, one or more monitoring agents (e.g., a monitoring program, a monitoring command, etc.) are executed by the CN. Information provided by the monitoring agents may be useful in identifying a problem and/or a cause of the problem (e.g., a root cause) with the CN (e.g., a misconfiguration in a database, a program that frequently crashes, etc.). Executing monitoring agent(s) by the CN consumes resources (e.g., physical resources) allocated to the CN. Moreover, monitoring agent(s) utilize programs, libraries, packages, etc. that are installed on the CN to perform monitoring operations. Such programs, libraries, packages, etc., by virtue of being installed, consume computing resources (e.g., memory, storage space, etc.) of the CN. Managing monitoring agents in a cloud environment is a challenging task, made even more difficult when recognizing that operations to monitor a CN may have pre-requisites that must be present prior to executing the monitoring operation. As used herein, a pre-requisite of a monitoring operation is defined to be any instruction (e.g., program, executable code, script, etc.), data (e.g., a configuration file, database, etc.), and/or configuration that is utilized for execution and/or performance of a monitoring operation. For example, a program (e.g., the JAVA™ runtime) may be required for execution of a monitoring operation.

Computing resource providers (e.g., cloud computing resource providers) have a variety of cost structures. However, in general, additional commands and/or processes executed by a virtual machine consume additional resources and, in turn, incur more costs to operate. Likewise, additional data (e.g., programs, configuration files, scripts, runtime environments, etc.) stored by the virtual machine consumes additional resources and, in turn, incurs more costs to operate. For example, a CN implementing a web server that responds to millions of requests daily may consume more resources and, in turn, cost more to operate, than a CN operating a web server that responds to ten requests daily. In some examples, storing additional programs and/or data (e.g., pre-requisites for monitoring operations) on a CN consumes additional storage resources associated with the CN, opens potential security holes, consumes software licenses, etc.

In some examples, virtual computing customers are provided with a service level agreement (SLA) by the service provider(s) hosting the CN(s). The SLA defines service level thresholds to be maintained by the service provider(s) such as, for example, an uptime requirement of 99.5%, a minimum memory allocation of sixteen gigabytes, up to 3.2 million seconds of compute time in a time period (e.g., one month, one week, etc.), etc.

As noted above, monitoring agents executed by the CN consume resources allocated to the CN. In view of the SLA limits, cost, etc., virtual computing customers are wary of allocating resources to functionality other than their desired processes (e.g., an email server, a file server, a database, etc.). Virtual computing customers, in an attempt to limit resource utilization, may disable monitoring agents. In scenarios where the CN is operating properly, results of the monitoring agents may not be a concern. However, in a time of crisis (e.g., when a server is malfunctioning and/or non-responsive), such monitoring agents can provide useful information for addressing a problem with the CN. In such a situation, if the monitoring agents were disabled, information for addressing a problem with a CN may not be available (e.g., even if the monitoring agent were enabled at the time a problem is discovered, information prior to and/or at the time that the problem occurred will likely not be available).

Example methods and apparatus to control the resource consumption of monitoring agents (e.g., by controlling the frequency at which monitoring operations are performed) are described in U.S. patent application Ser. No. 14/669,643, filed Mar. 26, 2015, entitled "METHODS AND APPARATUS TO CONTROL COMPUTING RESOURCE UTILIZATION OF MONITORING AGENTS," which is hereby incorporated herein by reference in its entirety.

Example methods and apparatus disclosed herein enable dynamic resource allocation for pre-requisites associated with monitoring agents. In examples disclosed herein, resources are allocated to monitoring agents by installing pre-requisite(s) for monitoring operation(s) when the monitoring operation(s) are to be executed, and/or by removing such pre-requisite(s) for the monitoring operation(s) when the monitoring operation(s) are no longer to be executed and/or it is determined that the pre-requisites are no longer needed and/or desired. Such installation and/or removal of pre-requisites reduces resources used in association with the monitoring operations. In some examples, installation and/or or removal of pre-requisites reduces security risks, reduces license consumption, etc. In examples disclosed herein, resources are dynamically allocated using different monitoring levels corresponding to different monitoring operations to be performed and the associated pre-requisites utilized for performing those monitoring operations.

FIG. 1 is a block diagram of an example system 100 constructed in accordance with the teachings of this disclosure to control computing resources allocated to monitoring agents of one or more example CNs 102 deployed in deployment environment 104. Monitoring resource utilization is controlled by an example virtual infrastructure navigator (VIN) 125. The example VIN 125 is administered by an administrator 155.

As noted above, the example deployment environment 104 includes one or more CNs 102. In the illustrated example of FIG. 1, the example deployment environment includes a manager 110, a host 115, and physical resources 120.

As used herein, the term "deployment environment" refers to a computing environment in, for example, a cloud platform provider (also referred to herein as a "cloud provider"). In some examples, separate deployment environments 104 may be used for development, testing, staging, and/or production. An example cloud provider can have one or multiple deployment environments.

The CNs 102 may include non-virtualized physical hosts, virtual machines (VM), containers (e.g., Docker® containers, etc.), hypervisor kernel network interface modules, etc. The example CNs 102 include an example monitoring agent 105 that executes monitoring operations to monitor their respective CNs 102 (e.g., to identify a level of processor utilization, to identify a level of memory utilization, to identify a network latency of a CN, to identify a query latency of a database hosted by a CN, etc.).

In some examples, the example deployment environment 104 of FIG. 1 includes one or more physical machines having the example physical resources 120. In the illustrated example, the host 115 manages the physical resources 120 (e.g., processor(s), memory, storage, peripheral devices, network access, etc.) of the physical machine(s). The example host 115 is a native operating system (OS) executing on the physical resources 120. In the illustrated example of FIG. 1, the host 115 executes the example manager 110. In some examples, the manager 110 is a virtual machine manager (VMM) that instantiates virtualized hardware (e.g., virtualized storage, virtualized memory, virtualized processors(s), etc.) from underlying physical hardware. In some examples, the manager 110 is a container engine that enforces isolation of physical resources 120 and/or an environment of the host 115 to isolate the CNs 102. As used herein, isolation means that the container engine manages a first container executing instances of applications and/or programs separate from a second (or other) container for the physical resources 120.

In the illustrated example of FIG. 1, the example CNs 102 execute within the example deployment environment 104 managed by the example manager 110. In some examples, one or more of the CNs 102 is a VM executing a guest OS (e.g., a Windows operating system, a Linux operating system, etc.) that accesses virtualized hardware instantiated by the manager 110 (e.g., a VMM, etc.). In some such examples, the one or more of the CNs 102 executes multiple applications and/or services. Additionally or alternatively, in some examples, one or more of the CNs 102 is a container. In some such examples, the one or more of the CNs 102 is isolated (e.g. via name spaces, etc.) by the manager 110 (e.g., a container engine, etc.) from other ones of the CNs 102 executing on the physical resources 120. Typically, such container-based CNs execute a single application and/or service and do not execute a guest OS.

In the illustrated example, the CNs 102 execute corresponding ones of the monitoring agents 105 to monitor operation(s) of their respective one of the CNs 102. The example monitoring agents 105 are configured with permissions required to monitor the respective one of the CNs 102 in response to a monitoring instruction received from a monitoring resource controller 130 of the example VIN 125. In response to execution of the monitoring instruction received from the example monitoring resource controller 130, the example monitoring agent 105 reports a result of the executed instruction. In some examples, the monitoring agents 105 execute directly on the CNs 102 (e.g., when the CNs 102 are VMs or non-virtualized physical machines, etc.). In some examples, the monitoring agents 105 execute as part of the manager 110 (e.g., when the CNs 102 are containers, etc.). In some examples, when a monitoring agent 105 is installed on one of the CNs 102, the monitoring agent 105 establishes communication with the example monitoring resource controller 130.

In some examples, the example monitoring agents 105 are executed in an execution environment of the respective CNs 102 that is separate from an execution environment utilized for implementing the functionality of the respective CNs 102. For example, a program executed by the CN (e.g., a web server, a file server, a video encoding application, etc.) may be operated in a first execution environment. Within the first execution environment, the program may have pre-requisites installed such as, for example, a database library, a configuration file, a scripting language interpreter, a background process, etc. Moreover, those pre-requisites may have particular version(s) installed. For example, the program may be executed using Java version 1.8, Python version 2, etc. In some examples, the monitoring agent 105 may have pre-requisites that match the pre-requisites of the program executed by the CN. In such examples, the monitoring agent 105 may utilize the existing pre-requisites of the first execution environment of the CN. However, in some examples, the monitoring agent 105 may have pre-requisites that are different from and/or conflict with the pre-requisites of the program executed by the CN. For example, the monitoring agent 105 may require Python version 3, whereas the program executed by the CN may require Python version 2. To ensure that functionality of the program executed by the CN is not affected by the monitoring operation (and/or its pre-requisites), the monitoring operation and/or the pre-requisites of the monitoring operation may be installed and/or executed in a second execution environment different from the first execution environment. In some examples, one or both of the first execution environment and the second execution environment are implemented as a container (e.g., a Docker® container, etc.).

Example methods and apparatus disclosed herein facilitate the automatic management of monitoring agents 105 deployed in the example CNs 102 by the VIN 125 (e.g., vCenter™ Infrastructure Navigator™, a commercially available product from VMWare®, Inc.) or similar component. The example VIN 125 includes the monitoring resource controller 130, a resource allocation database 140, the example monitoring profile 141, a monitoring result database 145, a monitoring agent pre-requisite repository 147, and an administrator interface 150.

The example VIN 125 enables a user (e.g., a virtual infrastructure administrator 155, etc.) to define one or more monitoring profiles for the CNs 102. In examples disclosed herein, the example VIN 125 automatically detects services running on the CNs 102 (e.g., a virtual machine, a physical machine, etc.) to determine which monitoring profile should be used when monitoring one or more of the example CNs 102. As used herein, the term "service" refers to software that can be installed on the CNs 102 and may be reused in multiple applications. In some examples, the services automatically detected by the example VIN 125 are compared to service rules. If an automatically detected service matches a service rule (e.g., the automatically detected service is identified in the service rule), the monitoring agent 105 is installed and/or configured on the one of the CNs 102 running the service without further intervention from the user.

The example monitoring resource controller 130 of the example VIN 125 manages monitoring operations performed by the monitoring agent(s) 105. Controlling monitoring operations performed by the monitoring agent(s) 105 enables control of the resources utilized by those monitoring agent(s) 105 (e.g., by controlling the rate of operations and/or the particular operations performed as described in U.S. patent application Ser. No. 14/669,643). Additionally, the example monitoring resource controller 130 may control the availability (e.g., installation, uninstallation, providing and/or revoking access rights, etc.) of pre-requisites of other monitoring operations. For example, executing a monitoring operation that has a large number of pre-requisites results in consumption of additional computing resources (e.g., memory, storage space, etc.) as compared to a monitoring operation that has few or no pre-requisites. If a monitoring operation will no longer be performed, or if a monitoring operation is to be performed infrequently (e.g., once a month), the example monitoring resource controller 130 may remove pre-requisites for the monitoring operation) from the CN. An example implementation of the example monitoring resource controller 130 is disclosed in connection with the example of FIG. 2.

When one of the example CNs 102 is operating stably and properly, the example monitoring resource controller 130 instructs the example monitoring agent 105 associated with the one of the CNs 102 to perform one or more monitoring operation(s) that does not have a large impact on the resources consumed by the one of the CNs 102. In some examples, the example monitoring resource controller 130 may also instruct the example monitoring agent 105 to perform the monitoring operation(s) infrequently. Instructing the example monitoring agent 105 to perform a monitoring operation (e.g., execute a command, execute a script, etc.) at a frequency that does not have a large impact on the resources consumed by the CN typically results in collection of less information concerning the operation of the CN. For example, a check on processor utilization does not consume many resources of the CN, but, at the same time, provides limited information concerning the operation of the CN. In some examples, when the monitoring operation returns a result that exceeds a threshold (e.g., processor utilization of a CN exceeds a threshold of 50%), the monitoring resource controller 130 instructs the monitoring agent 105 of the respective CN to perform additional monitoring operations and/or perform monitoring operations more frequently that consume additional resources, but provide additional information about the operation of the CN. In some examples, such monitoring operations are performed more frequently.

The example resource allocation database 140 of the illustrated example of FIG. 1 stores resource allocation information such as, for example, an example monitoring profile 141 associated with one or more of the example CNs.

To identify the monitoring operations associated with various monitoring levels of monitoring profiles associated with the example CNs 102, the example monitoring resource controller 130 consults the example resource allocation database 140. In the illustrated example of FIG. 1, the example resource allocation database 140 stores multiple monitoring profiles associated with respective CNs 102.

As used herein, a monitoring profile is defined as two or more monitoring levels that may be associated with one or more of the CNs 102. As used herein, a monitoring level is defined to include at least one of (1) a list of monitoring operations to be performed, (2) a testing frequency at which those monitoring operations are to be performed, (3) threshold failure conditions associated with those monitoring operations, or (4) a threshold period of time for which monitoring operations must produce a passing result before the monitoring level is decreased (a safe state threshold). Moreover, the monitoring level may be representative of a health (e.g., a system stability) of the CN. In some examples, the current monitoring level (e.g., monitoring level one, monitoring level two, monitoring level three, etc.) can be presented as an indicator of the current health of the CN.

The example monitoring profile 141 includes multiple monitoring levels (e.g., two monitoring levels, three monitoring levels, etc.), which each identify one or more monitoring operations to be performed, and one or more rules for transitioning between various monitoring levels of the example monitoring profile 141. In some examples, resources consumed by the monitoring operations of the various monitoring levels are controlled by setting a frequency at which monitoring operations are performed by the monitoring agents. In examples disclosed herein, a rate of resource consumption (e.g., a resource consumption rate) of a first monitoring level may be different from a rate of resource consumption of a second monitoring level.

The example resource allocation database 140 may be implemented by a volatile memory (e.g., a Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory). The example resource allocation database 140 may additionally or alternatively be implemented by one or more double data rate (DDR) memories, such as DDR, DDR2, DDR3, mobile DDR (mDDR), etc. The example resource allocation database 140 may additionally or alternatively be implemented by one or more mass storage devices such as hard drive disk(s), compact disk drive(s), digital versatile disk drive(s), etc. While, in the illustrated example, the example resource allocation database 140 is illustrated as a single database, the example resource allocation database 140 may be implemented by any number and/or type(s) of databases.

The example monitoring resource controller 130 logs monitoring results of the example monitoring operations in the example monitoring result database 145. Logging results of the monitoring operation(s) enables later evaluation of the results so that the administrator 155 (e.g., a user, a virtual computing customer, a developer, etc.) can review the results to aid in, for example, resolving a problem of the CNs 102. The example monitoring result database 145 may be implemented by a volatile memory (e.g., a Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory). The example monitoring result database 145 may additionally or alternatively be implemented by one or more double data rate (DDR) memories, such as DDR, DDR2, DDR3, mobile DDR (mDDR), etc. The example monitoring result database 145 may additionally or alternatively be implemented by one or more mass storage devices such as hard drive disk(s), compact disk drive(s), digital versatile disk drive(s), etc. While in the illustrated example the example monitoring result database 145 is illustrated as a single database, the example monitoring result database 145 may be implemented by any number and/or type(s) of databases.

The example monitoring agent pre-requisite repository 147 stores associations of monitoring operations and pre-requisites utilized for executing those monitoring operations. In some examples, the example monitoring agent pre-requisite repository 147 stores the pre-requisite (e.g., the program, the library, the script, etc. associated with the pre-requisite) and/or can store an address where such pre-requisites are available. In some examples, the monitoring agent pre-requisite repository 147 is implemented as part of, or in conjunction with, a package management system (e.g., the synaptic package manager system, etc.). The example monitoring agent pre-requisite repository 147 may be implemented by a volatile memory (e.g., a Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory). The example monitoring agent pre-requisite repository 147 may additionally or alternatively be implemented by one or more double data rate (DDR) memories, such as DDR, DDR2, DDR3, mobile DDR (mDDR), etc. The example monitoring agent pre-requisite repository 147 may additionally or alternatively be implemented by one or more mass storage devices such as hard drive disk(s), compact disk drive(s), digital versatile disk drive(s), etc. While in the illustrated example the example monitoring agent pre-requisite repository 147 is illustrated as a single database, the example monitoring agent pre-requisite repository 147 may be implemented by any number and/or type(s) of databases.

In the illustrated example, the administrator 155 may modify information stored in the example resource allocation database 140 via the administrator interface 150. The administrator 155 may modify the information stored in the example resource allocation database 140 to, for example, raise or lower thresholds associated with various monitoring operations (e.g., move the processor utilization threshold from 40% to 50%). Moreover, results of monitoring operation(s) stored in the monitoring result database 145 can be accessed by the administrator 155 via the administrator interface 150.

In some examples, the administrator 155 may set minimum and/or maximum monitoring levels to be used when monitoring a CN. In examples in which the monitoring level indicates the health (e.g., a stability) of a CN, setting minimum and/or maximum monitoring levels enables the administrator 155 to control a perceived health of the CN. For example, if a CN that is to be monitored executes a program that does not have a history of being stable, the administrator 155 may specify that a minimum monitoring level (e.g., monitoring level three) be used to ensure that the CN is monitored closely (e.g., the monitoring level will not drop below the set minimum monitoring level even if the safe state threshold is met). In contrast, if a CN that is known to be stable is to be monitored, the administrator 155 may specify the minimum monitoring level to be a low monitoring level (e.g., monitoring level zero) or the administrator 155 may not specify any minimum monitoring level. In some examples, the minimum and/or maximum monitoring levels are configured by modifying the monitoring profile associated with the CN.

In examples disclosed herein, the administrator interface 150 is implemented as a web page that presents diagnostic information concerning the CNs 102 (e.g., monitoring operation results stored in the example monitoring result database 145) and/or presents options for controlling monitoring operations associated with the CN (e.g., enables modification and/or configuration of the monitoring profile(s) stored in the resource allocation database 140). Additionally or alternatively, the administrator interface 150 may be implemented in any other fashion such as, for example, a graphical user interface, a file server (e.g., a file transfer protocol (FTP) server), a command line interface, etc.

Figure 2:
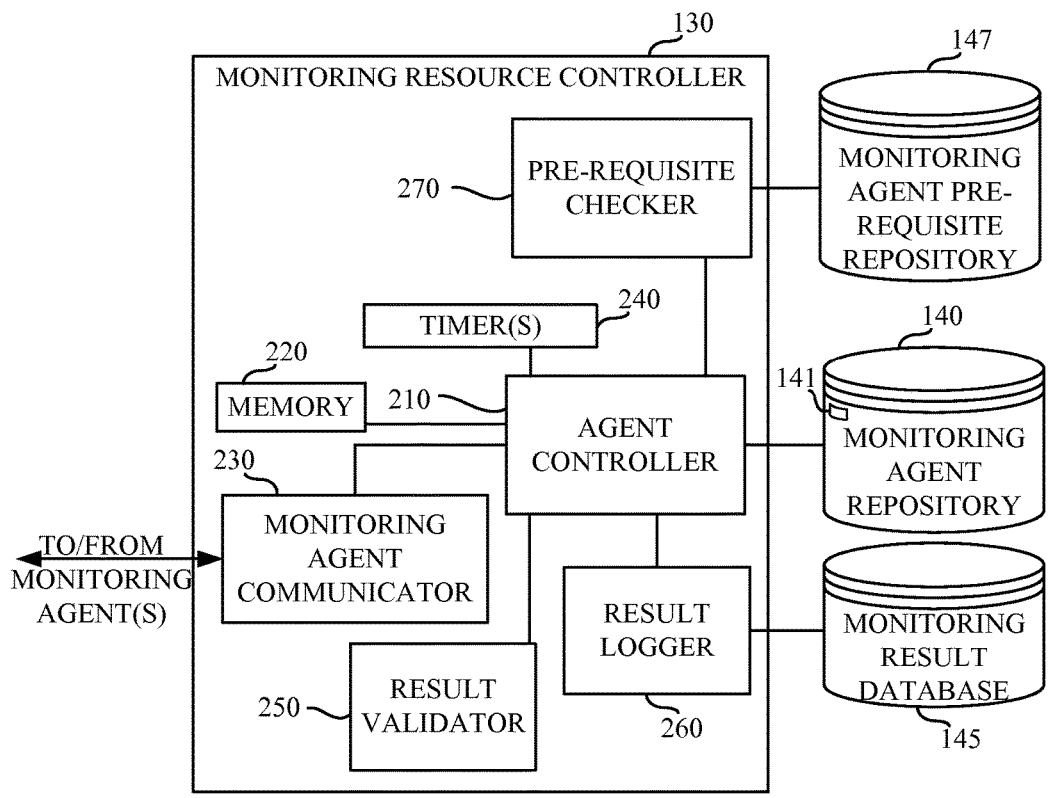
FIG. 2 is a block diagram of an example implementation of the example monitoring resource controller of FIG. 1.

FIG. 2 is a block diagram of an example implementation of the example monitoring resource controller 130 of FIG. 1. The example monitoring resource controller 130 of FIG. 2 includes an example agent controller 210, an example memory 220, an example monitoring agent communicator 230, one or more example timer(s) 240, an example result validator 250, an example result logger 260, and an example pre-requisite checker 270.

The example agent controller 210 interacts with the other components to control the monitoring resource utilization of the monitoring agent(s) 105 of the CNs 102. For example, the example agent controller 210 interfaces with the memory 220 to store operational data such as, for example, a monitoring level identifier, a pass/fail flag, etc. The example agent controller 210 controls operations of the example monitoring agent(s) 105 via the example monitoring agent communicator 230. The example agent controller 210 interfaces with the one or more example timers 240 to determine when the example agent controller 210 is to instruct the example monitoring agent(s) 105 to perform monitoring operations.

The example agent controller 210 receives result(s) of the monitoring operation(s) and validates the received result(s) via the example result validator 250. The example result validator 250 analyzes the received result(s) to determine whether the results indicate that the example CNs 102 are operating within an acceptable threshold and provides a validation result to the example agent controller 210. Based on the result of the validation, the example agent controller 210 may modify the monitoring operations of the monitoring agent(s) 105 by, for example, changing a monitoring level to increase or decrease a monitoring frequency, perform additional or fewer monitoring operations (e.g., only perform a processor utilization test, perform a database latency test in addition to a processor utilization test, etc.), etc. The example result logger 260 logs results of the monitoring operation(s) in the example monitoring result database 145.

In the illustrated example, the example agent controller 210 interacts with the pre-requisite checker 270 to inform the pre-requisite checker 270 of the current monitoring level and/or monitoring operations to be performed. The pre-requisite checker 270 interacts with the CN to determine whether or not pre-requisites of the monitoring operation(s) are present at the CN.

The example agent controller 210 of the illustrated example of FIG. 2 controls monitoring operation(s) of the example monitoring agent(s) 105. The example agent controller 210 monitors the example timer(s) 240 associated with the CNs 102 to determine, for example, whether to perform a monitoring operation, whether to modify a monitoring level, etc. In the illustrated example, multiple monitoring levels are defined within the example monitoring profile 141. Different monitoring profiles may be selected for use based on, for example, the type of CN being monitored. For example, a monitoring profile identifying monitoring operations to monitor a database might be used in association with a CN that hosts a database. In some examples, the monitoring profile to be used with a CN is selected automatically. However, the monitoring profile may be selected and/or configured in any other fashion, such as, by the administrator 155 via the example administrator interface 150.

To control the monitoring operations of the monitoring agent(s) 105, the example agent controller 210 determines a current monitoring level associated with the CNs 102, and performs a lookup of the example profile 141 within the resource allocation database 140 to identify (1) the testing frequency, (2) the list of monitoring operations to be performed and threshold failure conditions associated with those monitoring operations, and (3) the safe state threshold associated with those monitoring operations.

The example memory 220 stores operational data such as, for example a pass/fail flag, a current monitoring level, etc. received from the example agent controller 210. In the illustrated example, the example pass/fail flag is stored as a Boolean value (e.g., true or false). However, the example pass/fail flag may be stored in any other fashion. The example current monitoring level is stored as an integer value to represent the current monitoring level associated with a particular one of the CNs 102. However, the current monitoring level may be stored in any other fashion such as, for example, a floating point number, a text string, etc.

The example memory 220 may be implemented by a volatile memory (e.g., a Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory). The example memory 220 may additionally or alternatively be implemented by one or more double data rate (DDR) memories, such as DDR, DDR2, DDR3, mobile DDR (mDDR), etc. The example memory 220 may additionally or alternatively be implemented by one or more mass storage devices such as hard drive disk(s), compact disk drive(s), digital versatile disk drive(s), etc. While in the illustrated example the example memory 220 is illustrated as a single memory, the example memory 220 may be implemented by any number and/or type(s) of memories.

The example monitoring agent communicator 230 of the illustrated example of FIG. 2 communicates with the monitoring agent(s) 105 to instruct the monitoring agent(s) 105 to perform monitoring operations. Results of the monitoring operations performed by the monitoring agent(s) 105 are received via the example monitoring agent communicator 230. In the illustrated example, the example monitoring agent communicator 230 communicates with monitoring agent(s) 105 using a secure shell (SSH) over Internet Protocol (IP) communications. However, any other approach to communicating with and/or otherwise transmitting and/or receiving instructions and/or results to and/or from the monitoring agent(s) 105 may additionally or alternatively be used such as, for example, a file transfer protocol (FTP), a hypertext transfer protocol (HTTP), asynchronous JavaScript and Extensible Markup Language (XML) (AJAX), etc. Moreover, the example monitoring agent communicator 230 may utilize non-network based techniques for communicating with the monitoring agent(s). In some examples, the monitoring agent communicator 230 communicates with the monitoring agent(s) 105 via the example manager 110 of the deployment environment 104.

The example timer(s) 240 of the illustrated example indicate and/or are used to indicate a time since a last timer reset. In the illustrated example, the timer(s) are used to determine an amount of time that has passed since the last time that a monitoring operation was instructed to be performed by a monitoring agent, an amount of time that has elapsed since a prior monitoring operation produced a passing result, etc. In examples disclosed herein, the example monitoring resource controller 130 controls monitoring operations of multiple ones of the monitoring agent(s) 105 associated with respective ones of the CNs 102. As such, multiple timers (and/or sets of timers) may be associated with each of the respective CNs 102 to identify amounts of time that have elapsed in association with each of the respective ones of the CNs 102.

The example result validator 250 of the illustrated example of FIG. 2 receives results of the monitoring operations via the agent controller 210. The example result validator 250 compares the received results to thresholds associated with the monitoring operations that produced the results. To perform the comparison, the example result validator 250 identifies the monitoring operation that was performed and performs a lookup of the thresholds for the monitoring operations in the resource allocation database 140. In some examples, the example result validator 250 additionally uses a monitoring level to perform the lookup. For example, with reference to the example table of FIG. 4, the example result validator 250 may determine that, for a processor utilization monitoring operation operating at monitoring level one (e.g., row 450 of the illustrated example of FIG. 4), the threshold is twenty-five percent processor utilization. The example result validator 250 compares the received result of the monitoring operation to the threshold associated with the monitoring operation to determine whether the monitoring operation resulted in a pass or a failure. The result of the validation is provided to the agent controller 210 which may then, if applicable, modify the monitoring level and/or the monitoring operations to be performed by the monitoring agent(s).

In response to the validation, the example agent controller 210 may transition from a first monitoring level of the monitoring profile 141 to a second monitoring level of the monitoring profile 141 associated with the CNs 102. For example, in response to a failure condition, the agent controller 210 may increment the monitoring level and thereby instruct the monitoring agent 105 to perform additional and/or more intensive monitoring operations. Alternatively, in response to a passing condition, the example agent controller 210 may decrement the monitoring level and thereby instruct the monitoring agent 105 to perform fewer and/or less intensive monitoring operations.

As disclosed herein, monitoring operations are performed to produce monitoring results that are useful for system administrators in addressing problems with the example CNs 102. To that end, the example result logger 260 stores the results of the monitoring operations in the monitoring result database 145. In some examples, the result logger 260 adds a timestamp to the result(s) when storing the results in the monitoring result database 145. Timestamping the results enables later identification of when the monitoring operation was performed.

The example pre-requisite checker 270 communicates with the monitoring agent 105 via the monitoring agent communicator 230 to install and/or uninstall pre-requisite(s) associated with monitoring operations to be performed by the monitoring agent 105. In the illustrated example, the example pre-requisite checker 270 instructs the example monitoring agent 105 to install and/or uninstall the pre-requisites using a package manager of the CN (e.g., an apt-get package handling utility, a Windows installer utility, etc.). Moreover, in the illustrated example, the example pre-requisite checker 270 instructs the monitoring agent 105 to install the pre-requisite(s) from the monitoring agent pre-requisite repository 147. However, the pre-requisite checker 270 may instruct the monitoring agent 105 to install and/or uninstall the pre-requisite(s) from any other location such as, for example, a public repository, an Internet location, etc.

In some examples, in addition to and/or as an alternative to installing and/or uninstalling the pre-requisites of the monitoring operation(s), the example pre-requisite checker 270 instructs the monitoring agent 105 to modify an access right of the pre-requisite(s). In some examples, modifying the access right includes revoking an executable privilege of the pre-requisite, thereby rendering the pre-requisite inoperable. In some examples, pre-requisites might include one or more vulnerabilities. Operating a computing system with as few vulnerabilities (or zero vulnerabilities) as possible is desirable. Therefore, modifying the access right of the pre-requisite may be beneficial because, for example, it reduces the pre-requisites available for execution and, thus, reduces the vulnerabilities that are associated with removed pre-requisites.

In some examples, uninstallation of a pre-requisite may be undesirable because the uninstallation and/or potential later re-installation effort may consume large amounts of computing resources. For example, uninstallation of a pre-requisite may require ten minutes of uninstallation activity to complete the uninstallation. Instead of uninstalling the pre-requisite entirely, the example pre-requisite checker 270 modifies the access right to enable the pre-requisite to remain installed at the CN, but in a non-executable (e.g., inoperable) state. Leaving the pre-requisite installed, but in a non-executable state, conserves processing resources associated with uninstalling and/or reinstalling the pre-requisite while, for example, preventing associated security vulnerabilities associated with the pre-requisite. In some examples, the pre-requisite may include a process that executes in the background. In such examples, modifying the access right may additionally or alternatively include terminating the execution of the background process and/or preventing the background process from executing.

In some examples, the example pre-requisite checker 270 determines whether to uninstall a pre-requisite or modify an access right of the pre-requisite. In the illustrated example, the example pre-requisite checker 270 makes the determination based on an instruction in the monitoring profile 141. In the illustrated example, an administrator 155 selects an action (e.g., uninstall the pre-requisite, modify the access right of the pre-requisite, etc.) on a per-pre-requisite basis. However, in some examples, the example pre-requisite checker 270 may determine whether to uninstall a pre-requisite and/or modify the access right of the pre-requisite based on factor(s) such as, for example, a file size of the pre-requisite, an amount of computing resources utilized by a previous installation of the pre-requisite and/or an amount of computing resources that a previous uninstallation of the pre-requisite consumed, etc.

Figure 3:
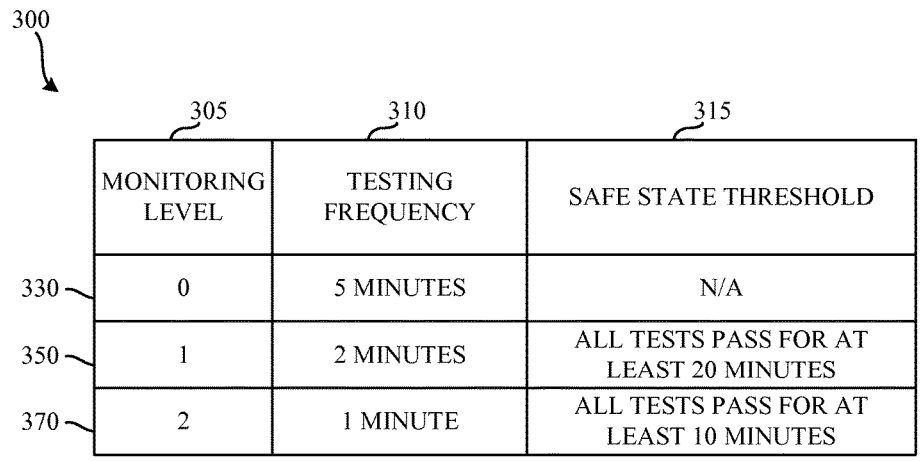
FIG. 3 is an example data table indicating parameters for example monitoring levels to be utilized by the example monitoring resource controller of FIG. 1.
Figure 4:
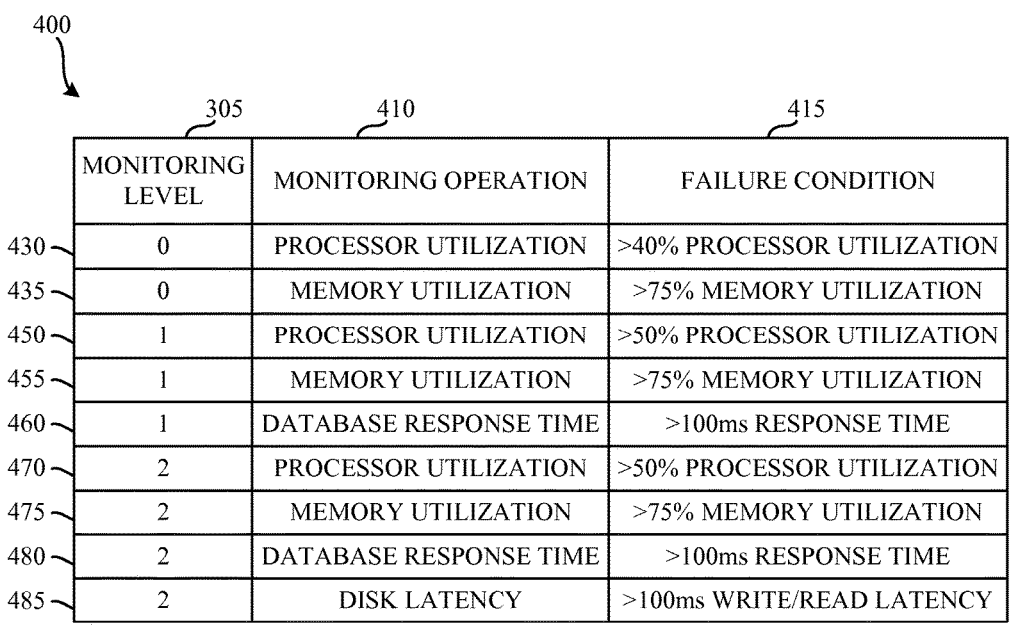
FIG. 4 is an example data table indicating example monitoring operations to be performed and failure conditions associated with those monitoring operations for the corresponding monitoring levels of FIG. 3.

The example data tables of FIGS. 3 and/or 4 represent the example monitoring profile 141. As noted above, the monitoring profile 141 may identify multiple monitoring levels (e.g., two monitoring levels, three monitoring levels, etc.), which each identify one or more monitoring operations to be performed, and one or more rules for transitioning between the monitoring levels of the example monitoring profile 141. FIG. 3 is an example data table 300 representing parameters associated with various monitoring levels of the example monitoring profile 141 of FIGS. 1 and/or 2 to be utilized by the example monitoring resource controller 130 of FIG. 1. FIG. 4 is an example data table 400 representing monitoring operations and failure conditions associated with the respective monitoring operations for the various monitoring levels of FIG. 3 associated with the example monitoring profile 141 to be utilized by the example monitoring resource controller 130 of FIG. 1. In the illustrated example, the example data tables 300 and 400 of FIGS. 3 and 4, respectively, are stored in the example resource allocation database 140.

The example monitoring profile 141 represented by the example data tables 300, 400 of FIGS. 3 and/or 4 is a monitoring profile to be used with a CN that provides database services. In practice, many different profiles may exist for use with many different CNs. For example, an email server monitoring profile might be used in association with an email server, a file server monitoring profile might be used in association with a file server, etc. Alternatively, some or all monitoring profiles may be generic to the type of work performed by a CN. Monitoring profiles may be modified by the administrator 155 via the administrator interface 150 to enable customization of the monitoring profile to a specific application. While the example monitoring profile 141 is represented in the illustrated examples of FIGS. 3 and/or 4 in a tabular format, any other format for representing a monitoring profile may additionally or alternatively be used. For example, the example monitoring profile 141 may be stored as an extensible markup language (XML) document, a comma separated value (CSV) document, etc.

The example data table 300 of the illustrated example of FIG. 3 includes a monitoring level column 305, a testing threshold column 310, and a safe state threshold column 315. The example monitoring level column 305 identifies different monitoring levels used in association with the monitoring profile 141. In the illustrated example of FIG. 3, three rows 330, 350, 370 representing three monitoring levels (zero, one, and two) are shown. However, the example monitoring profile 141 may have any number of levels such as, for example, two levels, five levels, ten levels, etc.

The example testing threshold column 310 of the illustrated example of FIG. 3 identifies how often monitoring operations associated with the identified monitoring level (identified by the monitoring level column 305) should be executed. Indicating a low frequency (e.g., perform monitoring operations every five minutes, ten minutes, etc.) results in low resource utilization by the monitoring agent 105. Conversely, indicating a higher frequency (e.g., perform monitoring operations every minute, every thirty seconds, every ten seconds, etc.) results in greater resource utilization by the monitoring agent 105. In the illustrated example of FIG. 3, a first monitoring level zero (row 330) indicates that monitoring operations should be performed every five minutes. That is, the example agent controller 210 will instruct the example monitoring agent 105 to perform the monitoring operations associated with the first monitoring level zero every five minutes. A second example monitoring level one (row 350) indicates that monitoring operations should be performed every two minutes (e.g., more frequently than the lower monitoring level one). A third example monitoring level two (row 370) indicates that monitoring operations should be performed every minute (e.g., more frequently than first example monitoring level zero and the second monitoring level one).

The example safe state threshold column 315 of the illustrated example of FIG. 3 identifies how long all monitoring operations must return a passing result before the selected monitoring level will be decreased. In the illustrated example, the first example monitoring level zero (row 330) does not have a safe state threshold value because, for example, the first example monitoring level (row 330) represents the least processor intensive monitoring operations that will be performed. In some alternatives, the lowest monitoring level may perform no monitoring operations and another trigger (other than a failed monitoring operation) may cause the monitoring level to increase (e.g., the monitoring level may be increased when the one of the CNs 102 that is monitored reports an error).

The second example monitoring level one (row 350) indicates that all monitoring operations must produce a passing result for at least twenty minutes before the monitoring level will be reduced to a monitoring level that utilizes less resource intensive monitoring operations (e.g., the first example monitoring level (row 330)). The third example monitoring level two (row 370) indicates that all monitoring operations must produce a passing result for at least ten minutes before the monitoring level will be reduced to a monitoring level that utilizes less resource intensive monitoring operations (e.g., the second example monitoring level one (row 350)). In some examples, the monitoring level is reduced by one level (e.g., monitoring level two is reduced to monitoring level one). However, as disclosed in connection with FIG. 5, monitoring levels may be modified in any fashion. For example, monitoring level two may be reduced to monitoring level zero (e.g., bypassing monitoring level one).

While, in the illustrated example, the safe state threshold column 315 is represented by thresholds indicating that all monitoring operations must produce a passing result for a threshold period of time, any other factors may additionally or alternatively be used to determine whether the monitoring level should be reduced. For example, an example safe state threshold may require that a threshold percentage of the monitoring operations have produced a passing result for a threshold period of time, an example safe state threshold may require that an administrator acknowledge and/or request that the monitoring level be reduced, etc.

The example data table 400 of the illustrated example of FIG. 4 includes the monitoring level column 305, an example monitoring operation column 410, and an example failure condition column 415. The example monitoring level column 305 of FIG. 4 corresponds to the example monitoring level column 305 of FIG. 3. The example data table 400 of the illustrated example includes example rows 430, 435, 450, 455, 460, 470, 475, 480, 485 that indicate monitoring operations that correspond to the monitoring level(s) of the example data table 300 of FIG. 3. For example, a first example row 430 and a second example row 435 indicate a monitoring level of zero, corresponding to the monitoring level of zero indicated by the first example row 330 of FIG. 3.

A third example row 450, a fourth example row 455, and a fifth example row 460 indicate a monitoring level of one, corresponding to the monitoring level of one indicated by the second example row 350 of FIG. 3. A sixth example row 470, a seventh example row 475, an eighth example row 480, and a ninth example row 485 indicate a monitoring level of two, corresponding to the monitoring level of two indicated by the third example row 370 of FIG. 3.

As noted above, the example data table 400 of the illustrated example of FIG. 4 includes the monitoring operation column 410. The example monitoring operation column 410 identifies a monitoring operation to be performed by the example monitoring agent 105. For example, the first example row 430 indicates that a processor utilization monitoring operation is to be performed when the monitoring level is zero. In the illustrated example of FIG. 4, different monitoring operations are identified such as, for example, a processor utilization monitoring operation (rows 430, 450, 470), a memory utilization test (rows 435, 455, 475), a database response time monitoring operation (rows 460, 480), and a disk latency test (row 485). However, any other monitoring operations may additionally or alternatively be used. For example, a network latency monitoring operation (e.g., to ensure that the example monitored one(s) of the CNs 102 is connected to a network and/or receiving network communications in a timely fashion), a permissions monitoring operation (e.g., to ensure that permissions are configured correctly), a disk utilization monitoring operation (e.g., to ensure that a particular level of disk space is available), etc., may additionally or alternatively be used.

While, in the illustrated example of FIG. 4, each monitoring level is associated with monitoring operations identified for the monitoring level (e.g., monitoring level two is associated with the monitoring operations of rows 470, 475, 480, 485), each monitoring level may inherit monitoring operations from another monitoring level. In some examples, instead of explicitly defining that monitoring level two includes a particular monitoring operation, the second monitoring level may inherit one or more monitoring operations from another monitoring level (e.g., a lower monitoring level). For example, the second monitoring level may inherit the processor utilization monitoring operation from monitoring level one (e.g., row 450) and/or monitoring level zero (e.g., row 430).

The example data table 400 of the illustrated example of FIG. 4 includes the example failure condition column 415. The example failure condition column 415 indicates parameters of the respective monitoring operation that must be obtained as a result of the testing to determine whether the monitoring operation resulted in a pass or a failure. While in the illustrated example, the example conditions of the example failure condition column 415 are represented in the negative (e.g., when a failure has occurred), the conditions may be represented in any other fashion such as, for example, in the positive (e.g., when a passing condition has occurred).

In the illustrated example of FIG. 4, different failure conditions are utilized for the same monitoring operation executed in the context of different monitoring levels. For example, whereas the processor utilization monitoring operation of monitoring level zero (row 430) indicates a failure condition when greater than 40% of the processor resources are utilized, the processor utilization monitoring operation of monitoring level one (row 450) indicates a failure condition when greater than 50% of the processor resources are utilized.

Different monitoring operations may involve different pre-requisites. For example, the database response time monitoring operation of row 460 and/or row 480 may require that a database driver be installed prior to executing the database response time monitoring operation, whereas the disk latency monitoring operation of row 485 may require that a disk utility be installed prior to executing the disk latency monitoring operation. In some examples, a monitoring operation may not have any defined pre-requisites. For example, the monitoring operation may involve functionality that is native to an operating system of the CN such that additional pre-requisites need not be installed.

Using different thresholds enables control of the monitoring level and, accordingly, resources used by the monitoring operations. For example, a low threshold (e.g., 20% processor utilization) at a first monitoring level might cause the monitoring resource controller 130 to transition to a second monitoring level that utilizes a higher threshold (e.g., 50% processor utilization), and hold at the second monitoring level until (a) no failure conditions occur for a threshold period of time (causing the example monitoring resource controller 130 to revert to the first monitoring level), or (b) a failure condition occurs at the increased threshold (causing the example monitoring resource controller 130 to transition to a third monitoring level).

While an example manner of implementing the example monitoring resource controller 130 of the example virtual infrastructure navigator (VIN) 125 of FIG. 1 is illustrated in FIG. 2, one or more of the elements, processes and/or devices illustrated in FIG. 2 may be combined, divided, re-arranged, omitted, eliminated and/or implemented in any other way. Further, the example agent controller 210, the example memory 220, the example monitoring agent communicator 230, the example timer(s) 240, the example result validator 250, the example result logger 260, the example pre-requisite checker 270, and/or, more generally, the example monitoring resource controller 130 of FIGS. 1 and/or 2, the example administrator interface 150 of FIG. 1, the example resource allocation database 140 of FIGS. 1 and/or 2, the example monitoring result database 145 of FIGS. 1 and/or 2, the example monitoring agent pre-requisite repository 147 of FIGS. 1 and/or 2, and/or the example administrator interface 150 of FIG. 1 may be implemented by hardware, software, firmware and/or any combination of hardware, software and/or firmware. Thus, for example, any of the example agent controller 210, the example memory 220, the example monitoring agent communicator 230, the example timer(s) 240, the example result validator 250, the example result logger 260, the example pre-requisite checker 270, and/or, more generally, the example monitoring resource controller 130 of FIGS. 1 and/or 2, the example administrator interface 150 of FIG. 1, the example resource allocation database 140 of FIGS. 1 and/or 2, the example monitoring result database 145 of FIGS. 1 and/or 2, the example monitoring agent pre-requisite repository 147 of FIGS. 1 and/or 2, and/or the example administrator interface 150 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example agent controller 210, the example memory 220, the example monitoring agent communicator 230, the example timer(s) 240, the example result validator 250, the example result logger 260, the example pre-requisite checker 270, and/or, more generally, the example monitoring resource controller 130 of FIGS. 1 and/or 2, the example administrator interface 150 of FIG. 1, the example resource allocation database 140 of FIGS. 1 and/or 2, the example monitoring result database 145 of FIGS. 1 and/or 2, the example monitoring agent pre-requisite repository 147 of FIGS. 1 and/or 2, and/or the example administrator interface 150 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example monitoring resource controller 130 of FIGS. 1 and/or 2 and/or the example VIN 125 of FIG. 1 may include one or more elements, processes and/or devices in addition to, or instead of, those illustrated in FIGS. 1 and/or 2, and/or may include more than one of any or all of the illustrated elements, processes and devices.

Figure 5:
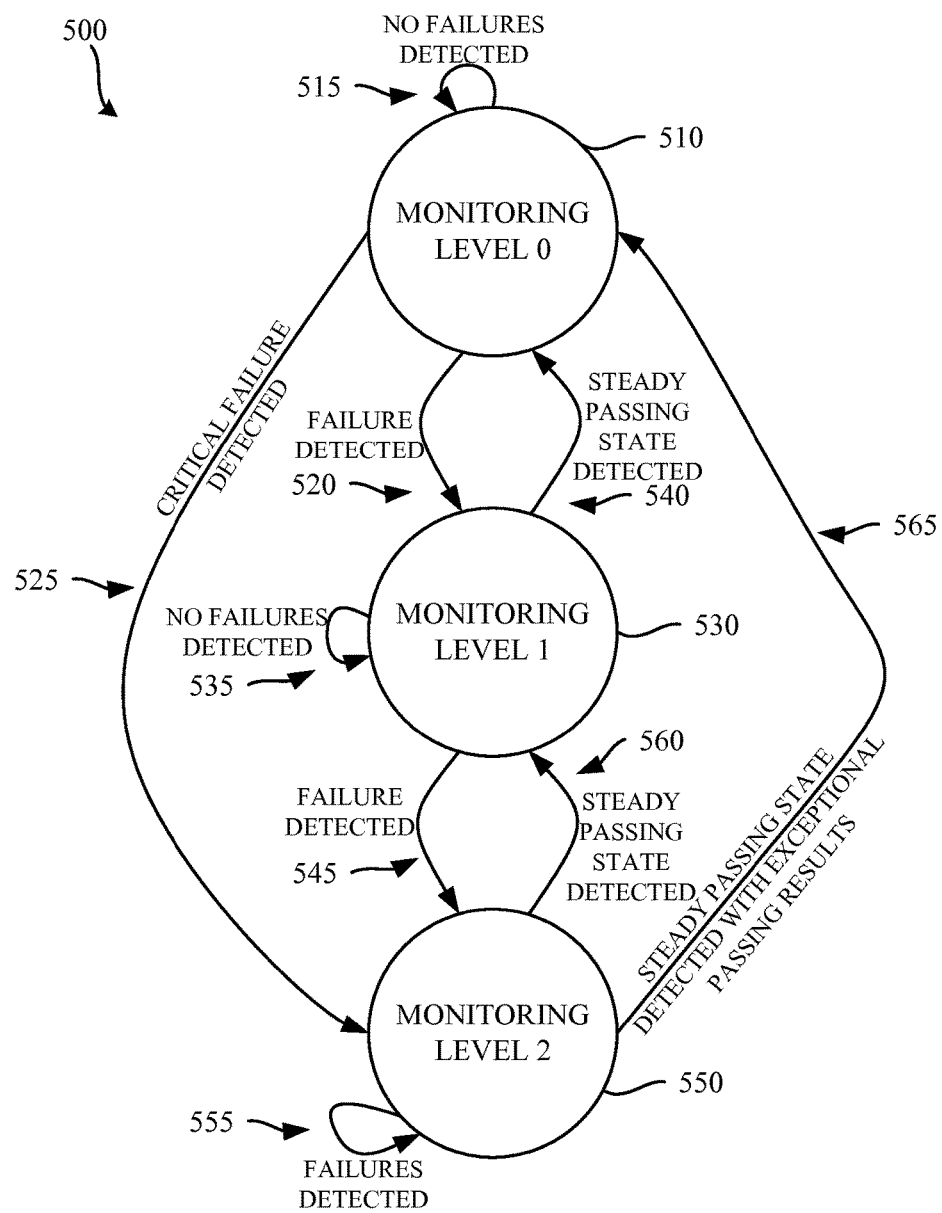
FIG. 5 is an example state diagram representing example transitions between the monitoring levels identified in the example data tables of FIGS. 3 and/or 4.

FIG. 5 is an example state diagram 500 illustrating example transitions between the monitoring levels identified in the example data tables of FIGS. 3 and/or 4. The example state diagram 500 of FIG. 5 includes three example monitoring levels: monitoring level zero 510, monitoring level one 530, and monitoring level two 550. In practice, any number of monitoring levels may additionally or alternatively be used such as, for example, two monitoring levels, five monitoring levels, ten monitoring levels, one hundred monitoring levels, etc.

As disclosed in connection with FIGS. 3 and/or 4, in the illustrated example lower monitoring levels are associated with less resources allocated to the monitoring agent 105, whereas higher monitoring levels are associated with additional resources allocated to the monitoring agent 105. Alternatively, the monitoring levels may be arranged in any fashion such as, for example, lower monitoring levels being associated with greater resources allocated to the monitoring agent 105 and higher monitoring levels being associated with lesser resources allocated to the monitoring agent. Further, as noted in connection with FIG. 4, different monitoring operations may be associated with different monitoring levels. In some examples, different monitoring operations may have different pre-requisites.

Starting with the example monitoring level zero 510, if no failures are detected while executing monitoring operations associated with monitoring level zero 510, the example agent controller 210 keeps the monitoring level at monitoring level zero 510 (edge 515). If a failure is detected while executing monitoring operations associated with monitoring level zero 510, the example agent controller 210 increases the monitoring level to monitoring level one 530 (edge 520). When transitioning from one monitoring level to another (e.g., as shown in edge 520, edge 525, edge 540, edge 545, edge 560, edge 565, etc.), the example pre-requisite checker 270 may determine whether the new monitoring level involves any monitoring operations that have unsatisfied pre-requisites and/or whether the new monitoring level involves different and/or fewer monitoring operations that render any of the installed pre-requisites unused. In some examples, the example pre-requisite checker 270 determines whether monitoring levels that have a possibility of being used within a threshold period of time (e.g., a monitoring level that is adjacent to the current monitoring level) identify any monitoring operations that have pre-requisites that are not currently installed. Installing such pre-requisites prior to reaching the point where monitoring operations that utilize those pre-requisites are to be executed ensures that there will be no unnecessary delay in performing the monitoring operations (e.g., no need to wait for pre-requisites to be installed).

In some examples, the severity of the failure is determined and is used to identify when a critical failure has occurred. In the illustrated example, while the example agent controller 210 detects a failure by determining that a result of a monitoring operation is greater than a first threshold, the example agent controller 210 detects a critical failure by determining that the result of the monitoring operation is greater than a second threshold that is higher than the first threshold. Alternatively, instead of using an upper threshold, any other approach for determining when a failure and/or a critical failure has occurred such as, for example, a lower threshold, a range of acceptable values, etc. If the example agent controller 210 detects a critical failure, the example agent controller 210 may increase the monitoring level to a monitoring level other than monitoring level one. In the illustrated example of FIG. 5, when the example agent controller 210 detects a critical failure, the example agent controller 210 increases the monitoring level to monitoring level two 550 (edge 525).

While operating at monitoring level one 530, if the example agent controller 210 does not detect a failure while executing monitoring operations associated with monitoring level one 530, the example agent controller 210 keeps the monitoring level at monitoring level one 530 (edge 535). In the illustrated example of FIG. 5, the example agent controller 210 decreases the monitoring level when a steady passing state is detected. The example agent controller 210 detects a steady passing state when, for example, no failing results are identified for a threshold period of time. In examples where failures have not been detected for a threshold period of time (e.g., when a steady passing state has been detected), the example agent controller 210 may revert the monitoring level to monitoring level zero 510 (edge 540). If the example agent controller 210 detects a failure while executing monitoring operations associated with monitoring level one 530, the example agent controller 210 increases the monitoring level to monitoring level two 550 (edge 545).

While operating at monitoring level two 550, if the example agent controller 210 does not detect any failures while executing monitoring operations associated with monitoring level two 550, the example agent controller 210 keeps the monitoring level at monitoring level two 550 (edge 555). If the example agent controller 210 identifies passing results as a result of the monitoring operations associated with monitoring level two 550 for a threshold period of time, the example agent controller 210 reverts the monitoring level to either monitoring level one 530 (edge 560) or monitoring level zero 510 (edge 565). In the illustrated example, the level to which the monitoring level is reverted is determined based on an exceptionality of the passing result. Similar to the determination of whether a failure is critical, the example agent controller 210 identifies exceptional passing results when the results indicate that a need for more resource intensive monitoring operations has passed. In the illustrated example, whereas the example agent controller 210 detects a passing result by determining that a result of a monitoring operation is less than the first threshold, the example agent controller 210 detects an exceptional passing result by determining that the result of the monitoring operation is less than a second threshold that is lower than the first threshold. Alternatively, instead of using a lower threshold, any other approach to determining when an exceptional passing result has occurred such as, for example, a higher threshold, a range of acceptable values, etc.

In situations where exceptional passing results are identified, the monitoring level may be decreased to a level that is not immediately adjacent the current monitoring level (e.g., decrease from monitoring level two to monitoring level zero, decrease two levels, decrease three levels, decrease to a level at which the monitoring operations had been occurring for a period of time prior to the problem that caused the monitoring level to increase, decrease directly to the lowest level, etc.). Such a transition is shown in the example edge 565. In some examples, the monitoring level is decreased without respect to whether a steady passing state is detected. For example, the monitoring level may be decreased only when an exceptional passing result is identified.

In the illustrated example of FIG. 5, the example agent controller 210 decreases the monitoring level when the steady passing state is detected. As noted above, the steady passing state is detected when, for example, no failing results are identified for a threshold period of time. In examples disclosed herein, the thresholds associated with various monitoring levels are different. For example, referring to the example data table 300 of FIG. 3, row 350 indicates that the safe state threshold for monitoring level one is twenty minutes, whereas row 370 indicates that the safe state threshold for monitoring level two is ten minutes. However, in some examples, the threshold associated with various monitoring levels may be the same. In examples where failures have not been detected for a threshold period of time (e.g., when a steady passing state has been detected), the monitoring level may be reverted to monitoring level one 530 (edge 560).

Figure 6A:
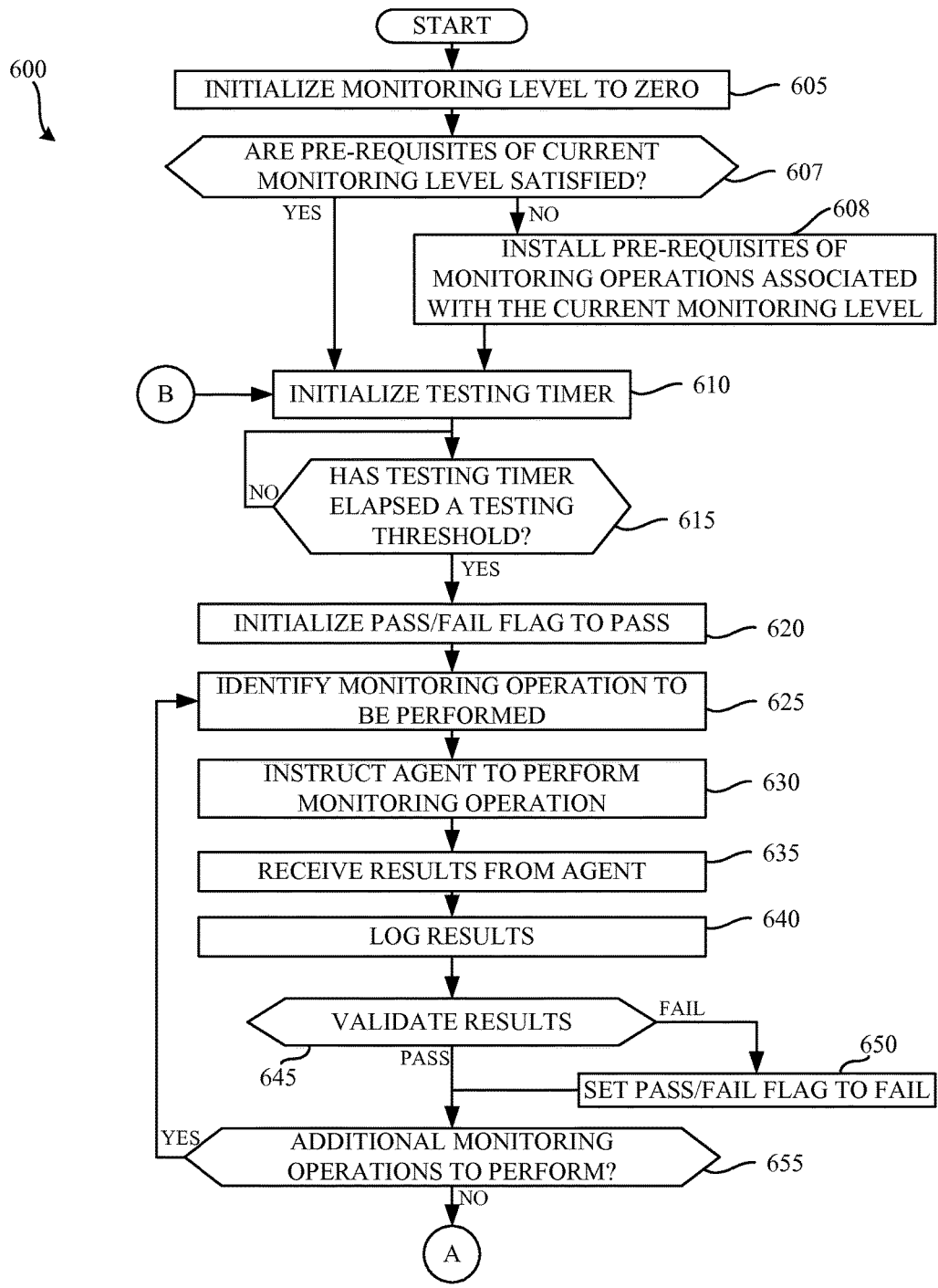
FIGS. 6A and 6B are a flow diagram representative of example machine readable instructions that may be executed to implement the example monitoring resource controller of FIG. 1 to control monitoring resource utilization of a compute node.
Figure 6B:
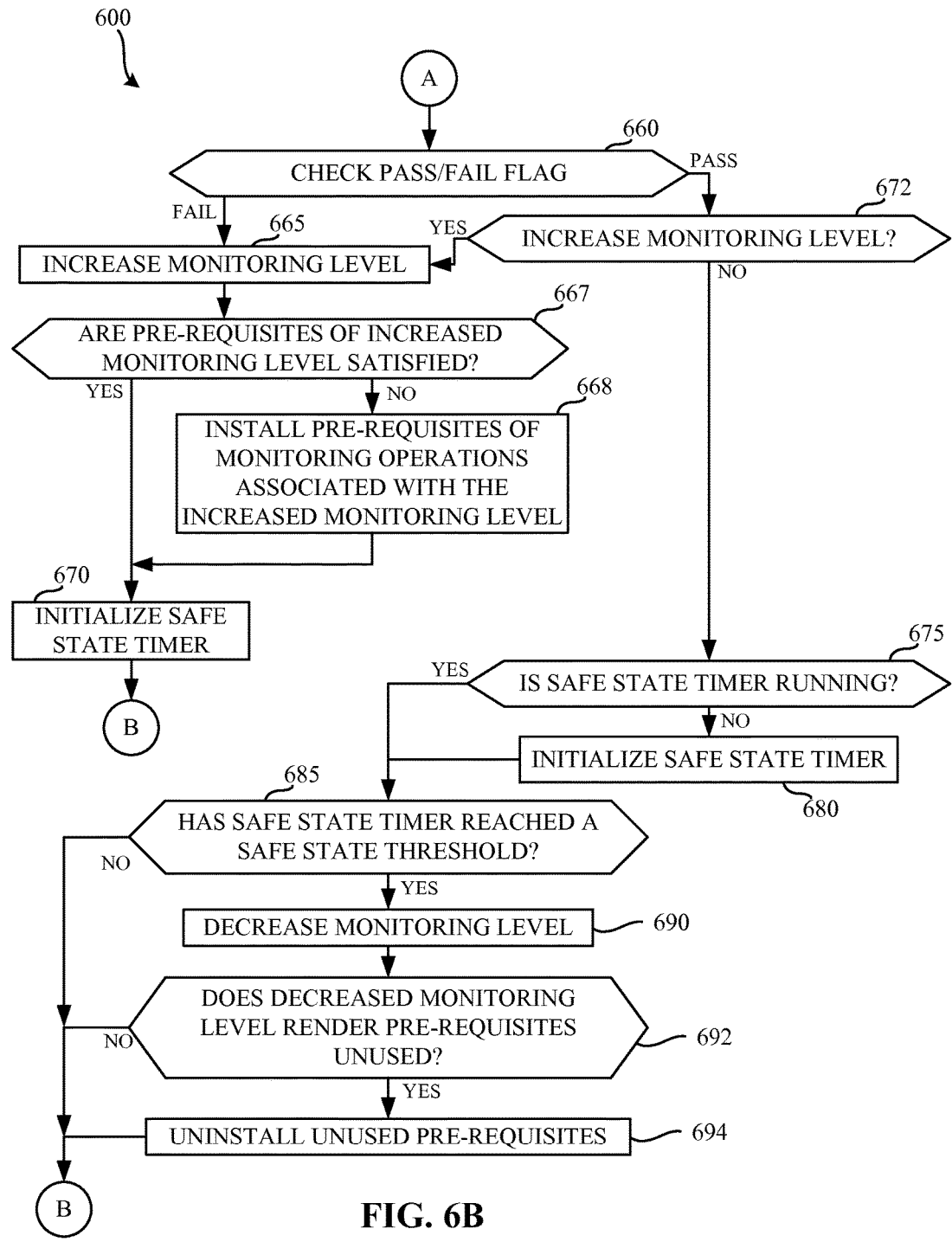

Flowcharts representative of example machine readable instructions for implementing the example monitoring resource controller 130 of FIGS. 1 and/or 2 are shown in FIGS. 6A, 6B, and/or 7. In these examples, the machine readable instructions comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart(s) illustrated in FIGS. 6A, 6B, and/or 7, many other methods of implementing the example monitoring resource controller 130 may alternatively be used. For example, the order of execution of the blocks may be changed, and/or some of the blocks described may be changed, eliminated, or combined.

As mentioned above, the example process(es) of FIGS. 6A, 6B, and/or 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example process(es) of FIGS. 6A, 6B, and/or 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

The program 600 of FIGS. 6A and/or 6B begins at block 605 when the example agent controller 210 initializes a monitoring level variable stored in the example memory 220. (Block 605). In the illustrated example, the monitoring level is initialized to zero (e.g., the least resource intensive monitoring level). However, the monitoring level may be initialized to any other value. For example, the monitoring level may be initialized to a least resource intensive monitoring level, a most resource intensive monitoring level, an intermediate monitoring level, etc.

The example pre-requisite checker 270 determines whether pre-requisites of the current monitoring level are satisfied at the CN 102. (Block 607). In the illustrated example, the example pre-requisite checker 270 communicates with the monitoring agent 105 via the monitoring agent communicator 230 to determine if the CN 102 is capable of performing the one or more monitoring operations associated with the current monitoring level. In the illustrated example, the monitoring agent 105 is instructed to interact with a package manager of the CN 102 (e.g., an apt-get package handling utility, a Windows installer utility, etc.) to confirm that pre-requisites of the one or more monitoring operations are met. Additionally or alternatively, the example pre-requisite checker 270 may communicate with the monitoring agent 105 to determine whether one or more files associated with the pre-requisite(s) of the monitoring operation are present at the CN 102. In some examples, the example pre-requisite checker 270 communicates with the monitoring agent 105 to confirm that the pre-requisites are properly configured for execution (e.g., executable permissions have been granted, etc.).

If the example pre-requisite checker 270 determines that the pre-requisites have not been met (Block 607), the example pre-requisite checker 270 communicates with the monitoring agent 105 to install and/or configure the pre-requisite(s) associated with the one or more monitoring operations associated with the current monitoring level. (Block 608). In the illustrated example, the example pre-requisite checker 270 instructs the example monitoring agent 105 to install the pre-requisites using a package manager of the CN 102 (e.g., an apt-get package handling utility, a Windows installer utility, etc.). Moreover, in the illustrated example, the example pre-requisite checker 270 instructs the monitoring agent 105 to install the pre-requisite(s) from the monitoring agent pre-requisite repository 147. However, the pre-requisite checker 270 may instruct the monitoring agent 105 to install the pre-requisite(s) from any other location such as, for example, a public repository, an Internet location, etc.

Once the example pre-requisite checker 270 confirms that the pre-requisite(s) are installed (Block 607 returns a result of YES) and/or completes installation of the pre-requisites (Block 608), the example agent controller 210 initializes a testing timer of the example timers 240. (Block 610). In the illustrated example, the testing timer represents a time since a last monitoring operation was performed. However, in some examples, the testing timer may represent a time at which the last monitoring operation was performed and the time since the last monitoring operation was performed may be calculated using the time at which the last monitoring operation was performed and a current time. In the illustrated example, the testing timer is initialized to zero. According to the illustrated example, the example agent controller 210 will wait until the testing timer reaches a first threshold before instructing the monitoring agent 105 to perform a monitoring operation. However, in some examples, the example agent controller 210 may begin the example process 600 by initializing the testing timer to a non-zero value to, for example, ensure that the first instruction(s) to perform a monitoring operation is transmitted to the monitoring agent 105 without delay.

The example agent controller 210 then determines whether the testing timer indicates a time that is greater than or equal to the testing threshold (frequency). (Block 615). The example agent controller 210 determines whether the testing timer indicates the time that is greater than or equal to the testing threshold by identifying a monitoring level and an identity of the monitoring profile and performing a lookup against the resource allocation database 140 to determine the testing threshold associated with the current combination of monitoring level and monitoring profile. For example, if the current monitoring level were zero, the example agent controller 210 consults row 330 of the example data table 300 of FIG. 3 to identify that the testing threshold is five minutes (indicating that monitoring operations are to be performed every five minutes). The example agent controller 210 continues to determine whether the time indicated by the testing timer indicates a time that is greater than or equal to the identified testing threshold (e.g., until block 615 produces a result of YES).

The example agent controller 210 then initializes a pass/fail flag stored in the memory 220. (Block 620). In the illustrated example, the pass/fail flag is initialized to a passing value (e.g., a "true" Boolean value). However, in some examples, the example pass/fail flag may be initialized to a failing value. The example agent controller 210 then identifies one or more monitoring operations to be performed. (Block 625). In the illustrated example, the example agent controller 210 identifies the monitoring operations by performing a lookup of the monitoring operations in the example resource allocation database 140 of FIG. 1. In the illustrated example, the lookup is performed using the currently identified monitoring level. However, in some examples, the lookup may be performed to identify monitoring operations associated with the current monitoring level and other monitoring levels. For example, the lookup may identify monitoring operations associated with the current monitoring level and inherited monitoring level(s) (e.g., other monitoring levels that are inherited by the current monitoring level). For example, monitoring level two may inherit the monitoring operations of monitoring level one and/or monitoring level zero.

In some examples, the example agent controller 210 additionally uses an identifier of the monitoring profile to perform the lookup. However, any other information may additionally or alternatively be used. An example lookup of the monitoring level may be performed with respect to the example data table 400 of FIG. 4. To, for example, identify monitoring operations to be performed when the monitoring level is zero, the example agent controller 210 selects rows 430 and 435, which are associated with a monitoring level of zero.

The example agent controller 210 then instructs the monitoring agent 105 to perform the monitoring operation(s) via the example monitoring agent communicator 230. (Block 630). The monitoring agent 105 performs the monitoring operation(s) and reports the result of the monitoring operation(s) to the agent controller 210 via the example monitoring agent communicator 230. (Block 635). The example result logger 260 logs the result of the monitoring operation in the monitoring result database 145. (Block 640). In the illustrated example of FIG. 6, the example result logger 260 logs all results to the monitoring result database 145. However, in some examples, the result logger 260 selectively logs results. For example, the result logger 260 may log results when the monitoring level is above a result logging threshold. For example, results of the monitoring operation may be logged when the monitoring level is non-zero. Selectively logging results reduces the amount of storage space that is required to store results that are achieved when the CNs 102 are operating properly.

The example result validator 250 validates the results of the monitoring operation. (Block 645). In the illustrated example, the example result validator 250 performs a lookup of the monitoring operation and monitoring level in the example resource allocation database 140 to identify an acceptable threshold of the result of the monitoring operation. For example, with reference to the example table of FIG. 4, the example result validator 250 may determine that for a processor utilization monitoring operation operating at monitoring level one (e.g., row 450 of the illustrated example of FIG. 4), the threshold is twenty-five percent processor utilization. The example result validator 250 compares the received result of the monitoring operation to the threshold associated with the monitoring operation to determine whether the monitoring operation resulted in a pass or a failure. If the monitoring operation resulted in a failure (Block 645, FAIL), the example agent controller 210 sets the pass/fail flag to fail. (Block 650).

If the monitoring operation resulted in a pass, (Block 645, PASS), control proceeds to block 655, where the example agent controller 210 determines whether there are additional monitoring operations to be performed. (Block 655). According to the illustrated example, the example agent controller 210 does not change the pass/fail flag to pass at this time. With respect to the example identification of monitoring operations performed against the example data table 400 of FIG. 4 while at monitoring level zero, there are two monitoring operations to be performed (rows 430, 435). If there are additional monitoring operations to be performed (e.g., not all of the operations identified in the lookup of Block 625 have been performed), control proceeds to block 625 where the subsequent monitoring operations are identified (Block 625). In some examples, the example agent controller 210 identifies monitoring operations associated with lower monitoring levels. For example, when at monitoring level one, the monitoring operations associated with monitoring level zero may additionally be performed.

The process of blocks 625-655 is repeated until all monitoring operations for the current monitoring level (and any inherited monitoring level(s)) have been performed (e.g., until block 655 produces a NO result). In the illustrated example, the monitoring operations are performed serially. However, in some examples, the monitoring operations may be performed in parallel. Moreover, the example monitoring operations are performed at substantially the same time. As used herein, performing monitoring operations at substantially the same time is defined to be performing two or more operations such that the start and/or end of the two monitoring operations are no more than one minute apart from each other.

In the illustrated example, once all monitoring operations associated with the current monitoring level have been performed (Block 655, NO), the example agent controller 210 checks the pass/fail flag to determine whether any monitoring operations resulted in the pass/fail flag being set to fail (e.g., by block 650). If the pass/fail flag is/has been set to fail (Block 660, FAIL), the example agent controller 210 increases the monitoring level (Block 665). Increasing the monitoring level results in additional and/or more resource intensive monitoring operations being performed and/or monitoring operations being performed more frequently by the monitoring agent 105. In some examples, the monitoring level is incremented and/or otherwise moved from a first level to a second level that is immediately adjacent the first level (e.g., incremented from monitoring level one to monitoring level two, incremented from monitoring level two to monitoring level three). However, the monitoring level may be increased in any other fashion. In some examples, the example agent controller 210 identifies a severity of the failure(s) that caused the monitoring level to be increased and increases the monitoring level based on the severity of the failure. For example, if the current monitoring level were zero and a processor utilization monitoring operation indicated that the processor was operating at one hundred percent utilization, the monitoring level may be increased to three (e.g., skipping monitoring levels one and two).

In the illustrated example, the example agent controller 210 represents the example monitoring level in integer levels (e.g., zero, one, two, etc.). However, the monitoring level may be represented in any other fashion such as, for example, a floating point number, a hexadecimal character, etc. In such an example, the example agent controller 210 may increase the monitoring level in increments less than a whole number (e.g., one half, one quarter, etc.) Moreover, the example agent controller 210 may increase the monitoring level by a value based on a severity of the failure. For example, if the processor utilization threshold were 50% and the monitoring operation identified a processor utilization of 51%, the example result validator 250 would determine the current processor utilization to be a failure. However, the severity of the failure is low (because 51% is not much more than 50%) and, as such, the failure might not be a cause for alarm. The example agent controller 210 might increase the monitoring level by a value that corresponds to the severity of the failure (e.g., one tenth, one half, etc.). When determining the monitoring level (e.g., in block 625), the example agent controller 210 may perform a mathematical rounding operation (e.g., rounding up, rounding down, etc.) to identify the appropriate monitoring level based on a partial value indicating a monitoring level (e.g., a value of 0.7 may represent a monitoring level of zero where partial values are rounded down to the nearest integer, a value of 1.3 may represent a monitoring level of one where the value is rounded to the nearest integer, etc.)

In some examples, the example controller 210 identifies a severe failure when, for example, the failure was produced by a result that is more than a second threshold number (e.g., twenty, thirty, etc.) of units (e.g., percentage points, milliseconds, etc.) above the threshold of the failure condition. For example, if a processor utilization monitoring operation having a failure condition of greater than 50% utilization produces a result greater than 70% utilization (e.g., the regular threshold plus 20%), the failure may be identified as a severe failure. When a severe failure is identified, the monitoring level may be increased by multiple levels to more quickly produce detailed monitoring results.

The example pre-requisite checker 270 determines whether pre-requisites of the increased monitoring level are satisfied at the CN 102. (Block 667). That is, the pre-requisites are validated upon transitioning to a different monitoring level. In the illustrated example, the example pre-requisite checker 270 communicates with the monitoring agent 105 via the monitoring agent communicator 230 to determine if the CN 102 is capable of performing the one or more monitoring operations associated with the increased monitoring level. In the illustrated example, the monitoring agent 105 is instructed to interact with a package manager of the CN 102 to confirm that pre-requisites of the one or more monitoring operations are met. Additionally or alternatively, the example pre-requisite checker 270 may communicate with the monitoring agent 105 to determine whether one or more files associated with the pre-requisite(s) of the monitoring operation are present at the CN 102. In some examples, the example pre-requisite checker 270 communicates with the monitoring agent 105 to confirm that the pre-requisites are properly configured for execution (e.g., executable permissions have been granted, etc.).

Communicating with the monitoring agent 105 upon transitioning between monitoring levels is beneficial because it facilitates a determination of whether pre-requisite(s) are to be installed prior to the point at which a monitoring operation that requires the pre-requisite(s) is to be executed. In some examples, the pre-requisite checker 270 determines whether pre-requisites of monitoring operations of a level other than the increased monitoring level are satisfied. Determining whether pre-requisites of monitoring operations of a level other than the increased monitoring level are satisfied enables identification of pre-requisites for monitoring operations that may be executed in the near future. Such pre-requisites can then be installed in advance of the need to execute the monitoring operation(s) associated with the other monitoring level. For example, if the monitoring level was increased from monitoring level zero to monitoring level one, the example pre-requisite checker 270 may determine whether pre-requisites of monitoring operation(s) associated with monitoring level two are satisfied (e.g., to prepare for a possible transition or monitoring level two).

If the example pre-requisite checker 270 determines that the pre-requisites have not been met (block 667), the example pre-requisite checker 270 communicates with the monitoring agent 105 to install the pre-requisite(s) associated with the one or more monitoring operations associated with the increased monitoring level. (Block 668). In the illustrated example, the example pre-requisite checker 270 instructs the example monitoring agent 105 to install the pre-requisites using a package manager of the CN. In the illustrated example, the example pre-requisite checker 270 instructs the monitoring agent 105 to install the pre-requisite(s) from the monitoring agent pre-requisite repository 147. Additionally or alternatively, the pre-requisite checker 270 may instruct the monitoring agent to install the pre-requisite(s) from any other location such as, for example, a public repository, an Internet location, etc.

Upon satisfaction of the pre-requisite verification (Block 667 returning a result of YES) and/or installation of the pre-requisite(s) (Block 668), the example agent controller 210 initializes a safe state timer provided by the timers 240. (Block 670). The safe state timer represents a time since a last failure condition was detected. In the illustrated example, the example safe state timer is initialized to zero, and counts upwards towards a threshold time. However, in some examples, the safe state timer may be initialized to the threshold time and count down to zero. The example safe state timer is used to determine when a monitoring level should be decreased (e.g., when a safe state has been reached). Control then proceeds to block 610, where the example agent controller 210 re-initializes the testing timer (Block 610), and determines whether the testing timer has elapsed the first threshold. (Block 615). The example process of blocks 610-660 is then repeated to continually monitor the example CNs 102.

Returning to block 660, if the example agent controller 210 determines that the pass/fail flag was set to pass (Block 660, PASS) (e.g., no failure conditions have been detected since the pass/fail flag was initialized in block 620), the example agent controller 210 determines whether there is some other reason to increase the monitoring level. (Block 672). In some examples, the example agent controller 210 considers factors other than the pass/fail flag to determine whether the monitoring level should be increased. For example, the example agent controller 210 may determine that a periodic timer has elapsed indicating that the monitoring level should be increased. In some examples, the periodic timer expires, causing the monitoring level to be increased without regard for whether the pass/fail flag indicated a pass or a failure. In some examples, lower monitoring levels may not provide enough information to adequately trigger an increase of a monitoring level at an appropriate time. For example, a problem condition may be occurring, but may not be detected by the monitoring operations performed at a lower monitoring level. To account for such a situation, the agent controller 210 may periodically increases the monitoring level to ensure that monitoring operations associated with the increased monitoring level do not indicate an error state.

The example agent controller 210 may consider any other factors when determining whether to increase the monitoring level. (Block 672). For example, the example agent controller 210 may determine whether an instruction from the administrator 155 has been received to increase the monitoring level. Additionally or alternatively, external stimuli may cause the example agent controller 210 to determine that the monitoring level should be increased. For example, an indication of an attack against another one of the CNs 102 (e.g., a distributed denial or service attack (DDOS), etc.) may cause a heightened level of scrutiny on the one of the CNs 102 under analysis, and may warrant an increase in the monitoring level.

If the monitoring level is not to be increased (Block 672 returns a result of NO), the example agent controller 210 determines whether the safe state timer is running (Block 675). If, for example, the example agent controller 210 determines that the example safe state timer is not running (Block 675, NO), the example agent controller 210 initializes the safe state timer. (Block 680). The check and initialization of blocks 675 and 680 are useful when, for example, the example monitoring resource controller 130 has just begun monitoring one of the CNs 102 and has not encountered a failure condition.

The example agent controller 210 determines whether the safe state timer has elapsed a safe state threshold. (Block 685). In the illustrated example, the example agent controller 210 identifies the safe state threshold by performing a lookup within the example resource allocation database 140 using the currently selected monitoring level. For example, with reference to the example data table 300 of FIG. 3, at monitoring level one, the example agent controller 210 determines that the safe state threshold is twenty minutes. If the safe state timer has not reached the safe state threshold (e.g., twenty minutes), the monitoring level should remain the same (e.g., be unchanged). Control then proceeds to block 610, where the example process of blocks 610 through 685 is repeated until the safe state timer reaches the safe state threshold. (Block 685, YES).

Once the example agent controller 210 determines that the safe state timer has reached the safe state threshold (Block 685), the example agent controller 210 decreases the monitoring level. (Block 690). In the illustrated example, decreasing the monitoring level results in fewer and/or less resource intensive monitoring operations being performed and/or being performed less frequently by the monitoring agent 105.

In the illustrated example, the monitoring level is decremented by an integer value. However, the example agent controller 210 may decrease the monitoring level by any other value. For example, the example agent controller 210 may decrease the monitoring level by multiple monitoring levels (e.g., the monitoring level may be decreased from monitoring level two to monitoring level zero.). The example monitoring level may be decreased by multiple monitoring levels to, for example, ensure that after passing conditions are detected, that the resources allocated to the monitoring agent are reduced.

In some examples, the example controller 210 identifies an exceptional passing result when, for example, the result of the monitoring operation is less than a threshold number (e.g., twenty, thirty, etc.) of units (e.g., percentage points, milliseconds, etc.) below the threshold of the failure condition. For example, if a processor utilization monitoring operation that has a failure condition of greater than 50% utilization produces a result less than 30% utilization, the passing result may be identified as an exceptional passing result (e.g., a result that is more than 20% below the failure threshold). When an exceptional passing result is identified, the monitoring level may be decreased by multiple levels to more quickly reduce the amount of monitoring resources allocated to the monitoring agent. In some examples, an exceptional passing result may cause the safe state timer threshold to be ignored. For example, if the safe state timer will not reach the safe state threshold for another ten minutes, but an exceptional passing result is identified (indicating that the problem condition that triggered the additional monitoring resources to be allocated has passed), the example agent controller 210 may immediately decrease the monitoring level (Block 690) to reduce the amount of allocated monitoring resources.

Once the monitoring level has been decreased (Block 690), the example pre-requisite checker 270 determines whether the decreased monitoring level, renders any of the installed pre-requisites unused. (Block 692). In some examples, decreasing the monitoring level results in pre-requites that were previously installed (e.g., for monitoring operation(s) of an increased monitoring level) being unused, unneeded, etc. (e.g., monitoring operations at the reduced monitoring level may not utilize the pre-requisites). As such, those unused pre-requisites consume resources (e.g., storage resources) of the CN 102 but are not utilized by the CN 102 to produce monitoring results. Thus, in a similar fashion to block 667, the example pre-requisite checker 270 verifies the pre-requisites of monitoring operations operated at the different monitoring level upon transitioning to the different monitoring level. In the illustrated example, the example pre-requisite checker 270 communicates with the monitoring agent 105 via the monitoring agent communicator 230 to determine if any installed pre-requisites are rendered unused as a result of the transition to the different monitoring level.

In the illustrated example, the monitoring agent 105 is instructed to interact with a package manager of the CN 102 to identify unused pre-requisites. Additionally or alternatively, the example pre-requisite checker 270 may communicate with the monitoring agent 105 to determine whether one or more files associated with the pre-requisite(s) of the monitoring operation are present at the CN.

In some examples, the pre-requisite checker 270 consults the monitoring agent pre-requisite repository 147 to identify lists of pre-requisites associated with monitoring operations associated with various monitoring levels (e.g., a current monitoring level and a level that is being transitioned to). The example pre-requisite checker 270 compares the lists of pre-requisites to identify whether any pre-requisites are no longer used as a result of the monitoring level transition. The pre-requisite checker 270 may communicate with the monitoring agent 105 to remove (e.g., uninstall, disable, modify an access permission of, etc.) the pre-requisite(s) identified as no longer used as a result of the monitoring level transition. Moreover, the pre-requisite checker 270 may leave any pre-requisites that are identified as used by monitoring operations of both monitoring levels as is (e.g., those pre-requisites are not modified).

In some examples, the pre-requisite checker 270 determines whether pre-requisites of monitoring operations of a level other than the decreased monitoring level are rendered unused as a result of the decreased monitoring level. For example, if the monitoring level was decreased from monitoring level one to monitoring level zero, the example pre-requisite checker 270 may determine whether pre-requisites of monitoring operation(s) associated with monitoring level two are unused. Determining whether pre-requisites of monitoring operations of a level other than the prior monitoring level are rendered unused enables identification of pre-requisites for monitoring operations that may no longer be executed in the near future. For example, it may be expected that the monitoring level may soon be re-increased to level one. To prepare for such an increase, the pre-requisite checker 270 may not verify that whether the pre-requisites of level one are unused.

If the example pre-requisite checker 270 determines that the pre-requisites are rendered unused (Block 692), the example pre-requisite checker 270 communicates with the monitoring agent 105 to uninstall the unused pre-requisite(s). (Block 694). In the illustrated example, the example pre-requisite checker 270 instructs the example monitoring agent 105 to uninstall the pre-requisites using a package manager of the CN 102. However, the example monitoring agent 105 may uninstall the unused pre-requisites in any other fashion. Moreover, in some examples, the example pre-requisite checker 270 may instruct the monitoring agent 105 to modify an access right associated with the pre-requisite. In some examples, the access right is modified such that the pre-requisite is no longer executable. Modifying the access right is useful because it reduces the likelihood that a vulnerability of the pre-requisite might be exploited. In some examples, the example pre-requisite checker 270 may instruct the monitoring agent 105 to terminate a background process of the pre-requisite.

Once the unused pre-requisite(s) is at least one of uninstalled or has had an access right modified, control proceeds to block 610, where the example process of blocks 610 through 694 is repeated to enable continual monitoring of the example CNs 102.

Figure 7:
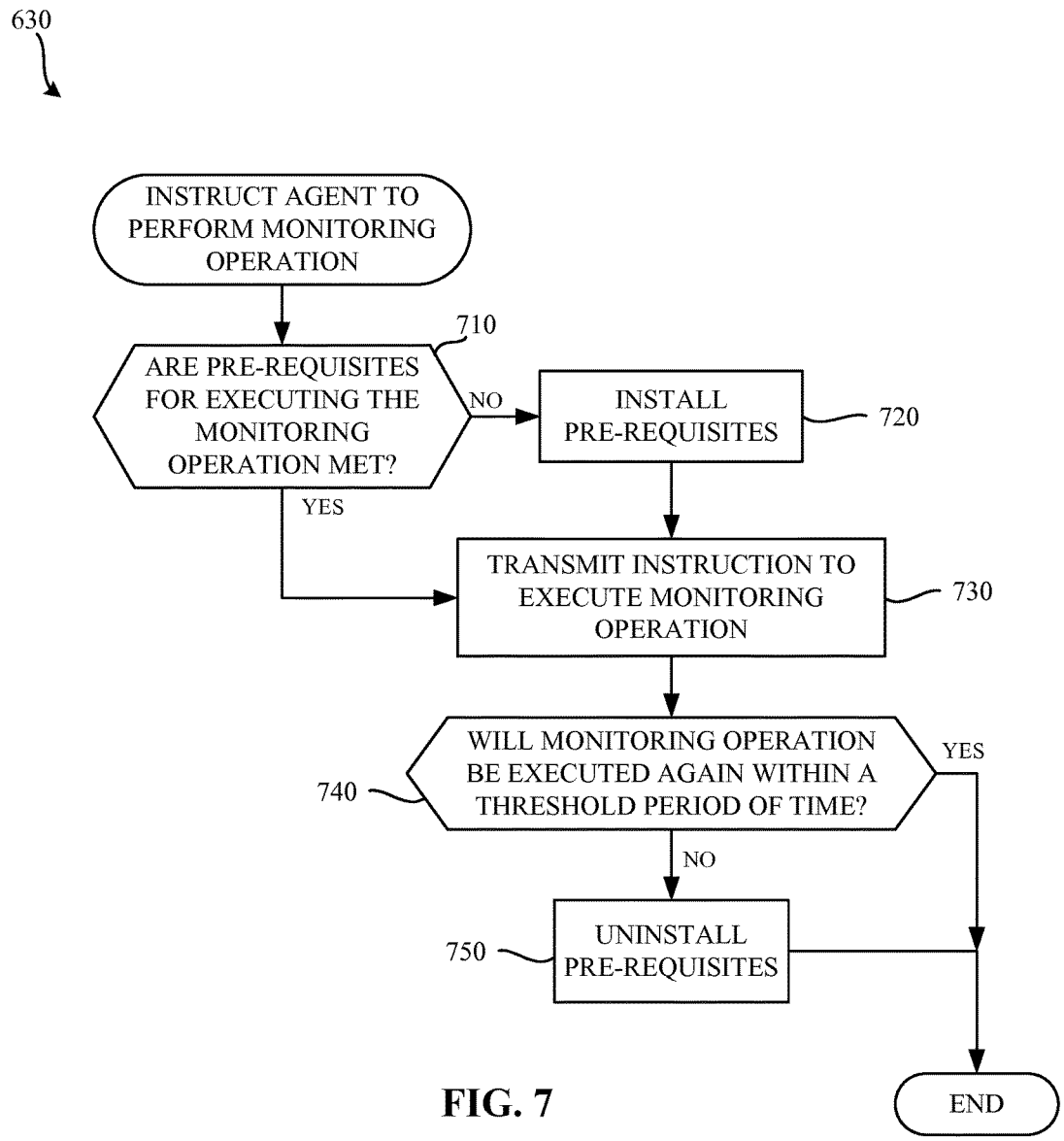
FIG. 7 is a flow diagram representative of example machine-readable instructions that may be executed to implement the example monitoring agent controller of FIG. 1 to instruct a monitoring agent to perform a monitoring operation.

In the illustrated example of FIGS. 6A and/or 6B, pre-requisite verifications are performed upon transitioning between monitoring levels. However, pre-requisite verifications may be performed at any other time. For example, pre-requisites may be verified at the time of executing a monitoring operation (e.g., Block 630 of FIG. 6A). FIG. 7 is a flow diagram representative of example machine-readable instructions that may be executed to implement the example monitoring resource controller 130 of FIG. 1 to instruct a monitoring agent 105 to perform a monitoring operation. The example program 700 of FIG. 7 may be executed in addition to and/or as an alternative to Block 630 of FIG. 6A.

The program 700 of FIG. 7 begins at block 710 when the example pre-requisite checker 270 determines whether a pre-requisite(s) of a monitoring operation to be performed by the monitoring agent 105 is met at the CN 102. (Block 710). That is, the pre-requisites may be validated substantially immediately prior to executing a monitoring operation. In the illustrated example, the example pre-requisite checker 270 communicates with the monitoring agent 105 via the monitoring agent communicator 230 to determine if the CN 102 is capable of performing the one or more monitoring operation(s) (e.g., the one or more monitoring operation(s) identified in Block 625 of FIG. 6A). In the illustrated example, the monitoring agent 105 is instructed to interact with a package manager of the CN 102 to confirm that pre-requisites of the one or more monitoring operation(s) are met. Additionally or alternatively, the example pre-requisite checker 270 may communicate with the monitoring agent 105 to determine whether one or more files associated with the pre-requisite(s) of the monitoring operation are present at the CN. In some examples, the example pre-requisite checker 270 communicates with the monitoring agent 105 to confirm that the pre-requisites are properly configured for execution (e.g., executable permissions have been granted, etc.).

Communicating with the monitoring agent 105 substantially immediately prior to requesting execution of a monitoring operation is beneficial because it facilitates a determination of whether pre-requisite(s) are to be installed prior to the point at which a monitoring operation that requires the pre-requisite(s) is to be executed. Such pre-requisites can then be installed in advance of the need to execute the monitoring operation(s) associated with the other monitoring level.

If the example pre-requisite checker 270 determines that the pre-requisites have not been met (Block 710 returns a result of NO), the example pre-requisite checker 270 communicates with the monitoring agent 105 to install the pre-requisite(s) associated with the one or more monitoring operations associated with the increased monitoring level. (Block 720). In the illustrated example, the example pre-requisite checker 270 instructs the example monitoring agent 105 to install the pre-requisites using a package manager of the CN 102. Moreover, in the illustrated example, the example pre-requisite checker 270 instructs the monitoring agent 105 to install the pre-requisite(s) from the monitoring agent pre-requisite repository 147. Additionally or alternatively, the pre-requisite checker 270 may instruct the monitoring agent 105 to install the pre-requisite(s) from any other location such as, for example, a public repository, an Internet location, etc.

Upon satisfaction of the pre-requisite verification (Block 710 returning a result of YES) and/or installation of the pre-requisite(s) (Block 720), the example agent controller 210 transmits an instruction to the example monitoring agent 105 to cause the monitoring agent 105 to perform the one or more monitoring operation(s) (Block 730).

Upon completion of the execution of the monitoring operation, the example pre-requisite checker 270 determines whether the monitoring operation(s) will be executed again within a threshold period of time (e.g., a threshold period of time established by the administrator 155). (Block 740). In some examples, the monitoring operation(s) may be performed once a day (e.g., once every twenty four hours which may exceed an example threshold). In such an example, the pre-requisites that are installed to enable execution of those monitoring operation(s) may be unnecessary for large periods of time between executions. For example, if the monitoring operation operates for one minute out of every twenty four hours, the pre-requisites for that monitoring operation may be unused for the other twenty three hours and fifty nine minutes. To, among other reasons, conserve resources of the CN 102, the pre-requisites may be uninstalled and/or rendered unusable when the monitoring operation is not expected to be executed within a threshold period of time.

In the illustrated example, the example pre-requisite checker 270 determines the next expected execution time of the monitoring operation by consulting the example data table 300 of FIG. 3 stored in the example resource allocation database 140 to determine the configured testing frequency (column 310) for the monitoring operation at the current monitoring level. If the monitoring operation is not expected to be executed within the threshold period of time (e.g., ten minutes, one hour, two hours, one day, etc.), the example pre-requisite checker 270 communicates with the monitoring agent 105 to uninstall the unused pre-requisite(s). (Block 740). In the illustrated example, the example pre-requisite checker 270 instructs the example monitoring agent 105 to uninstall the pre-requisites using a package manager of the CN 102. Additionally or alternatively, the example monitoring agent 105 may uninstall the unused pre-requisites in any other fashion.

Returning to block 740, if the monitoring operation is expected to be executed again within the threshold period of time (Block 740 returns a result of YES) and/or upon uninstallation of the pre-requisite(s) of the monitoring operation (Block 750), the example process 700 of FIG. 7 terminates. Control may then proceed, for example, to block 635 of FIG. 6A, where the results of the monitoring operation(s) are received.

Figure 8:
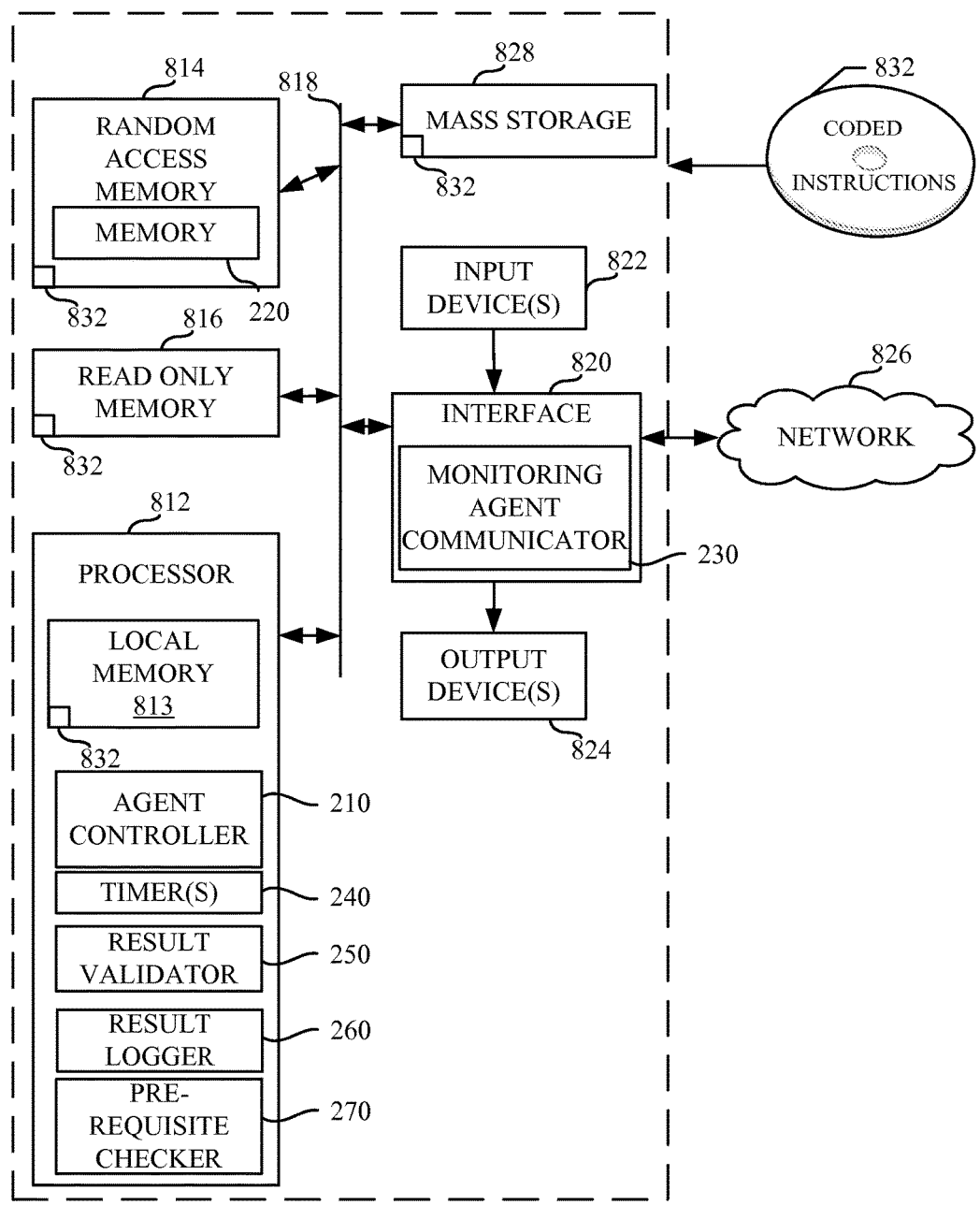
FIG. 8 is a block diagram of an example monitoring resource controller structured to execute the example machine-readable instructions of FIGS. 6A, 6B, and/or 7 to implement the example virtual infrastructure navigator of FIG. 1.

FIG. 8 is a block diagram of an example processor platform 800 capable of executing the instructions of FIGS. 6A, 6B, and/or 7 to implement the example monitoring resource controller 130 of FIGS. 1 and/or 2. The processor platform 800 can be, for example, a server, a personal computer, an Internet appliance, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache), and executes instructions to implement the example agent controller 210, the example timer(s) 240, the example result validator 250, the example result logger 260, and/or the example pre-requisite checker 270. The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller. In the illustrated example of FIG. 8, the example volatile memory 814 implements the example memory 220. However, the example memory 220 may be implemented in any other fashion.

The processor platform 800 of the illustrated example also includes an interface circuit 820. The interface circuit 820 may be implemented by any type of interface standard, such as an Ethernet interface, a universal serial bus (USB), and/or a PCI express interface. The example interface 820 implements the example monitoring agent communicator 230.

In the illustrated example, one or more input devices 822 are connected to the interface circuit 820. The input device(s) 822 permit(s) a user to enter data and commands into the processor 812. The input device(s) can be implemented by, for example, a keyboard, a button, a mouse, and/or a touchscreen.

One or more output devices 824 are also connected to the interface circuit 820 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIG. 6 may be stored in the mass storage device 828, in the volatile memory 814, in the non-volatile memory 816, and/or on a removable tangible computer readable storage medium such as a CD or DVD.

From the foregoing, it will be appreciated that the above disclosed methods, apparatus and articles of manufacture control resource utilization of monitoring agents.

As noted above, virtual computing customers are put in a situation where they must either enable the monitoring agent(s) and risk monitoring a system when such monitoring is unnecessary (perhaps even increasing the cost of operating such systems), or disable the monitoring agent(s) and risk a lack of information in the event of a problem. Example methods and apparatus disclosed herein enable dynamic installation, uninstallation, access, etc. to pre-requisites utilized by monitoring operations of the monitoring agent(s). In some examples, pre-requisites are installed as they become necessary, and are removed as they become unnecessary, thereby ensuring that monitoring operations and pre-requisites associated therewith do not consume more resources (e.g., storage resources) than necessary.

In some examples, instead of uninstalling a pre-requisite that is no longer necessary, an access right of the pre-requisite is modified such that the pre-requisite is no longer executable. Modifying the access right is useful because it reduces the likelihood that a vulnerability of the pre-requisite might be exploited. Likewise, once the pre-requisite is to be used, the access right may again be modified to enable execution of the pre-requisite. Modifying the access right to enable or disable execution of a pre-requisite avoids consumption of resources that would otherwise be used during the installation and/or uninstallation of the pre-requisite.

Moreover, example methods and apparatus disclosed herein conserve resources not only with respect to an individual CN being monitored, but conserve computing resources across the entire deployment environment. For example, if a deployment environment implements one hundred CNs, reducing the computing resources used to monitor those CNs frees up significant computing resources for other CNs to be operated (e.g., to perform useful operations). That is, the existing physical resources used to host the CNs operate more efficiently. Additionally or alternatively, reducing the computing resources used to monitor those CNs enables reductions in the physical resources used by the deployment environment.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to control a monitoring agent, the method comprising:
   instructing, by executing an instruction with a processor, a monitoring agent of a compute node to perform a first monitoring operation associated with a first monitoring level;
   in response to the first monitoring operation returning a first result that is within an acceptable threshold, transitioning to a second monitoring level; and
   in response to determining that the first monitoring operation is not expected to be executed within a threshold period of time, revoking an executable privilege of a pre-requisite of the first monitoring operation at the compute node.

2. The method as described in claim 1, wherein the pre-requisite is at least one of a program or a library used by the first monitoring operation.

3. The method as described in claim 1, further including determining that the second monitoring level does not include the first monitoring operation.

4. The method as described in claim 1, wherein the first monitoring level corresponds to a health of the compute node.

5. The method as described in claim 1, wherein the first monitoring level is associated with one or more monitoring operations to be performed when the compute node is at the first monitoring level, the one or more monitoring operations including the first monitoring operation.

6. The method as described in claim 1, further including installing the pre-requisite of the first monitoring operation at the compute node at least one of prior to or in response to instructing the monitoring agent to perform the first monitoring operation.

7. The method as described in claim 1, wherein the pre-requisite is a first pre-requisite, and further including installing, in response to transitioning to the second monitoring level, a second pre-requisite of a second monitoring operation associated with the second monitoring level.

8. The method as described in claim 1, wherein the first monitoring operation is performed to monitor a process of the compute node that is executed in a first execution environment of the compute node, and the pre-requisite is installed in a second execution environment different from the first execution environment.

9. The method as described in claim 1, wherein revoking an executable privilege of the pre-requisite of the first monitoring operation at the compute node is performed without uninstalling the pre-requisite of the first monitoring operation.

10. An apparatus to control a monitoring agent, the apparatus comprising:
    an agent controller communicator to instruct a monitoring agent of a compute node to perform a first monitoring operation associated with a first monitoring level;
    an agent controller to, in response to the first monitoring operation returning a first result that is within an acceptable threshold, transition to a second monitoring level; and
    a pre-requisite checker to, in response to determining that the first monitoring operation is not expected to be executed within a threshold period of time, revoke an executable privilege of a pre-requisite of the first monitoring operation at the compute node, wherein at least one of the agent controller communicator, the agent controller, or the pre-requisite checker is implemented by at least one processor.

11. The apparatus as described in claim 10, wherein the pre-requisite checker is further to install the pre-requisite of the first monitoring operation at the compute node at least one of prior to or in response to instructing the monitoring agent to perform the first monitoring operation.

12. The apparatus as described in claim 10, wherein the pre-requisite is a first pre-requisite, and the pre-requisite checker is further to install, in response to transitioning to the second monitoring level, a second pre-requisite of a second monitoring operation associated with the second monitoring level.

13. The apparatus as described in claim 10, wherein the first monitoring operation is performed to monitor a process of the compute node that is executed in a first execution environment of the compute node, and the pre-requisite checker is to install the pre-requisite in a second execution environment different from the first execution environment.

14. A tangible computer readable storage medium comprising instructions which, when executed, cause a machine to at least:
    instruct a monitoring agent of a compute node to perform a first monitoring operation associated with a first monitoring level;
    in response to the first monitoring operation returning a first result that is within an acceptable threshold, transition to a second monitoring level; and
    in response to determining that the first monitoring operation is not expected to be executed within a threshold period of time, revoke an executable privilege of a pre-requisite of the first monitoring operation at the compute node to a non-executable state.

15. The tangible computer readable storage medium as described in claim 14, wherein the first monitoring level is associated with one or more monitoring operations to be performed when the compute node is at the first monitoring level, the one or more monitoring operations including the first monitoring operation.

16. The tangible computer readable storage medium as described in claim 14, wherein the instructions, when executed, cause the machine to install the pre-requisite of the first monitoring operation at the compute node at least one of prior to or in response to instructing the monitoring agent to perform the first monitoring operation.

17. The tangible computer readable storage medium as described in claim 14, wherein the pre-requisite is a first pre-requisite, and the instructions, when executed, cause the machine to install, in response to transitioning to the second monitoring level, a second pre-requisite of a second monitoring operation associated with the second monitoring level.

18. The tangible computer readable storage medium as described in claim 14, wherein the first monitoring operation is performed to monitor a process of the compute node that is executed in a first execution environment of the compute node, and the pre-requisite is installed in a second execution environment different from the first execution environment.

* * * * *